(12) United States Patent
Kreutzkämper et al.

(10) Patent No.: US 9,146,006 B2
(45) Date of Patent: Sep. 29, 2015

(54) METERING DEVICE, LUBRICATING DEVICE AND METHOD FOR DISPENSING A PREDETERMINED AMOUNT OF LUBRICANT

(75) Inventors: Jürgen Kreutzkämper, Berlin (DE); Hans-Dieter Nelson, Panketal (DE); Fabian Schmidt, Großbeeren (DE); Jörg Schwartz, Potsdam (DE)

(73) Assignee: AKTIEBOLAGET SKF, Gothenburg (SE)

( * ) Notice: Subject to any disclaimer, the term of this patent is extended or adjusted under 35 U.S.C. 154(b) by 491 days.

(21) Appl. No.: 13/428,586

(22) Filed: Mar. 23, 2012

(65) Prior Publication Data

US 2012/0247876 A1  Oct. 4, 2012

(30) Foreign Application Priority Data

Mar. 28, 2011 (DE) ...................... 20 2011 000 700 U
Apr. 11, 2011 (DE) .......................... 10 2011 007 125

(51) Int. Cl.
| F16N 13/00 | (2006.01) |
| F16N 3/00 | (2006.01) |
| F16N 7/38 | (2006.01) |
| F16N 29/02 | (2006.01) |

(52) U.S. Cl.
CPC ............... *F16N 7/385* (2013.01); *F16N 29/02* (2013.01); *F16N 2270/30* (2013.01)

(58) Field of Classification Search
CPC ...... F16N 2270/30; F16N 29/02; F16N 7/385
USPC .................. 184/7.1, 7.4; 384/473–475; 137/9
See application file for complete search history.

(56) References Cited

U.S. PATENT DOCUMENTS

| 4,572,056 | A | * | 2/1986 | Funke ................................ 92/86 |
| 5,711,615 | A | * | 1/1998 | Stitz et al. ....................... 384/473 |
| 6,623,251 | B2 | * | 9/2003 | Nawamoto et al. ............ 417/290 |
| 8,714,309 | B2 | * | 5/2014 | Carothers et al. .............. 184/6.1 |
| 2009/0218110 | A1 | * | 9/2009 | Laskaris et al. .................. 169/44 |
| 2011/0042605 | A1 | * | 2/2011 | Gyger et al. .................... 251/333 |
| 2012/0128533 | A1 | * | 5/2012 | Deguchi et al. .................. 422/62 |

FOREIGN PATENT DOCUMENTS

| DE | 19511198 A1 | 10/1996 |
| DE | 10011659 A1 | 3/2001 |
| DE | 10347176 A1 | 6/2004 |

(Continued)

OTHER PUBLICATIONS

Gyger, "Micro valve SMLD," "Gefunden im Internet," Nov. 18, 2013, col. 2 Grease dispensing systems for ball bearing Valve type SMLD 300G; Seite 3.

*Primary Examiner* — William E Dondero
*Assistant Examiner* — Robert T Reese
(74) *Attorney, Agent, or Firm* — Bryan Peckjian; SKF USA Inc. Patent Dept.

(57) ABSTRACT

A metering device for dispensing a predetermined amount of lubricant includes a lubricant reservoir, which retains a lubricant and dispenses it under pressure via an outlet of the lubricant reservoir, and a metering apparatus, which comprises at least one microvalve. The microvalve is fluidly coupled with the outlet of the lubricant reservoir and dispenses the predetermined amount of lubricant in a defined manner. The metering apparatus is spatially separable from the lubricant reservoir.

20 Claims, 13 Drawing Sheets

(56) References Cited

FOREIGN PATENT DOCUMENTS

| | | | |
|---|---|---|---|
| DE | 69433065 T2 | 6/2004 | |
| DE | 60107364 T2 | 5/2005 | |
| EP | 0854314 A2 | 7/1998 | |
| EP | 1579951 A1 | 9/2005 | |
| WO | WO2008083509 A1 | 7/2008 | |
| WO | 2010085489 A1 | 7/2010 | |

\* cited by examiner

METERING DEVICE, LUBRICATING DEVICE AND METHOD FOR DISPENSING A PREDETERMINED AMOUNT OF LUBRICANT

TECHNICAL FIELD

Exemplary embodiments relate to a metering device, a lubricating system and a method for dispensing a predetermined amount of lubricant.

RELATED ART

Many components of machines, and machine parts that move relative to one another, are guided or supported by bearings, in order for example to reduce wear or noise generation and thus increase the service life and/or maintenance intervals of the relevant machine or the relevant components. Bearings are used in a plurality of different embodiments, for example as sliding bearings or as rolling-element bearings. The type of relative motion, which is to be guided with the help of the bearing, determines at least partially the bearing technology that will be employed. Linear bearings are thus distinguished for example from other bearings that facilitate rotary movements (rotation) between components.

Bearings are thus used in almost all mechanical components wherein relative movements occur. Here the requirements that are imposed on the bearing during the operation of the machine vary, to some extent very significantly. While in some applications almost no loads or rather insignificant loads occur on the bearing, there are other fields of application of bearings wherein they are especially heavily loaded, for example due to a static mechanical load, due to environmental conditions (e.g. temperature, corrosive media, impulsive movements acting on the machine) or due to occurrent speeds or accelerations.

Especially in the area of such demanding bearings, it can be very advisable to ensure a controlled supply of a lubricant to the bearing. Studies have shown that a significant proportion of bearing failures is indirectly or directly attributable to an inadequate lubrication. Besides an insufficient supplying with the lubricant, i.e. an insufficient lubrication per se, a fouling of the respective bearing can be, in particular, attributed indirectly to an inadequate lubrication. Other reasons for bearing failures are frequently to be found, ranging from installation errors, an overloading, an occurrence of a mechanical bearing failure, or an operational error (handling error).

With increasing demands on the bearings, the demands placed on the lubricant itself also increase. For example in the field of machine tools, high-speed spindles are increasingly used nowadays, which facilitate rotational speeds of 20000, 40000 or 60000 rotations/min and more. In some devices more than 100000 rotations/min (e.g. up to 150000 rotations/min) are even used. These demands, due on the one hand to the high rotational speeds and on the other hand to the limited installation space available, place very high demands on the bearing as well as on the lubrication.

But other technical fields wherein bearings are used also place increasing demands on the metering accuracy, the reaction time, the mobility and continuity, the monitoring, the environmental impact and the reliability of the lubricant supply. Moreover the amount of lubricant required in operation and the air consumption of the machine often should also be reduced.

A conventional grease lubrication is often no longer possible at high rotational speeds, and can even prove harmful in some applications.

An oil+air lubrication of the bearing is often conventionally used nowadays. Here the bearings are laterally sprayed with an oil mist or a stream out of a nozzle, wherein oil is introduced into the interior of the nozzle, which oil is entrained by an auxiliary air stream (e.g. compressed air) and carried through the nozzle to the bearing. Besides a significant consumption of compressed air, whose production leads to a significant energy consumption, moisture and/or contaminants can also be entrained with the auxiliary air stream, which deposit in the bearing and can lead to damage there.

With oil+air lubrication, the oil is guided into the nozzle and is caught by the auxiliary air there in the course of a random or statistical process, and is accelerated through the nozzle to the rolling-element bearing. Which exact quantity of oil is transported to the bearing here depends on a plurality of barely controllable conditions. For example, the oil level in the nozzle fluctuates. Also how much oil is entrained by the auxiliary air stream is a purely statistical process.

Oil+air lubrication can thus often not facilitate a steady oil supply, and therefore can be inaccurate, as it is unclear how much oil is located exactly where in the interior of the nozzle and how much therefore exits through the nozzle in the form of a stream at a particular moment. Because of this uncertainty, an over- or under-lubrication of the bearing can result at a given moment, even though the lubrication is activated. The oil+air lubrication can therefore have a certain latency period, and is therefore perceived as being sluggish.

SUMMARY

In view of these circumstances, there is a long-felt need to provie a more precise or more defined dispensing of a lubricant to a machine part of a machine.

A metering device for providing a predetermined amount of lubricant according to an exemplary embodiment comprises a lubricant reservoir, which is formed to retain a lubricant and to dispense the lubricant under pressure through an outlet of the lubricant reservoir, and a metering apparatus which comprises a microvalve. The microvalve is fluidly coupled to the outlet of the lubricant reservoir, and is formed to dispense the predetermined amount of lubricant in a defined manner. Further the metering apparatus is spatially separable from the lubricant reservoir.

A lubricant system according to an exemplary embodiment comprises such a metering device and a machine having a machine part to be lubricated, wherein the machine part is fluidly coupled with the microvalve of the metering device, so that the microvalve can dispense the predetermined amount of lubricant to the machine part in a defined manner. The lubricant reservoir is disposed spatially separated from the metering apparatus.

A method for dispensing a predetermined amount of lubricant according to an exemplary embodiment comprises a dispensing of a lubricant from a lubricant reservoir under pressure to a microvalve of a spatially separated metering apparatus and a defined dispensing of the predetermined amount of lubricant through the microvalve to a machine part of a machine.

The recognition underlying exemplary embodiments is that a precise or defined dispensing of a predetermined amount of lubricant through the use of a microvalve is possible, which can be disposed as close as possible to a to-be-lubricated machine part of a machine. In this way, supply paths, in which lubricant is lost due to leaks or other unwanted effects, can be shortened, so that a supplying of lubricant is achievable with an improved precision. If necessary, the lubricant reservoir can be attached at another place, at which more installation space may be available. The microvalve is in this case fluidly coupled on the input side with an outlet of the lubricant reservoir. The lubricant reservoir dispenses the lubricant to the microvalve under pressure. An improved lubrication of the machine part of the machine can thus be made possible, since the metering can occur close to the relevant machine part.

In this case a predetermined amount of lubricant is not only understood to be a predetermined amount of lubricant continuously dispensed over a predetermined dispensing time of a single dispensing cycle, but also an equivalent interrupted or not continuously dispensed amount of lubricant over more than one dispensing cycle, wherein the dispensing cycles can differ from each other with respect to their duration. A temporal flow rate can also vary in a monitored or controlled way during one or more dispensing cycles. Similarly, a predetermined amount of lubricant is also understood to be a lubricant flow dispensed over a dispensing duration, which is continuous, but possibly varies in a monitored or controlled way with respect to its temporal flow rate. In other words, the predetermined amount of lubricant is dispensed from the microvalve to a machine part to be lubricated in a defined and non-statistical way.

The microvalve is in this case coupled with the outlet of the lubricant reservoir so that the pressurized lubricant is available at an input of the microvalve. This lubricant can then be blocked by the microvalve or allowed to pass through to an outlet of the microvalve. In other words, the microvalve is fluidly coupled with the outlet of the lubricant reservoir.

The microvalve can here, for example, be implemented as a piston valve, membrane valve, poppet valve, ball valve, sliding valve or also using other valve technology. It can for example be designed as a solenoid valve, i.e. as an electromagnetic valve, or also as an electromechanical valve.

The lubricant can for example be a liquid medium. These can for example include oil, but also low-viscosity greases and other liquid lubricating agents or lubricants.

In other words, the metering device or the micropump is formed to supply, dispense, eject or introduce the predetermined amount of lubricant in a defined way to a machine part of a machine, i.e. in a controlled manner and not only in a statistical average.

In a metering device according to an exemplary embodiment, the microvalve can be formed to dispense a smallest possible amount of lubricant as the predetermined amount of lubricant, which is no more than 10 µl. In other exemplary embodiments the smallest possible amount of lubricant can also correspond to 5 µl, 1 µl, 750 nl, 500 nl, 300 nl, 200 nl, 100 nl or 50 nl. Here the relationships 1 µl=1 mm$^3$ and 1 nl=10$^{-3}$ µl=10$^{-3}$ mm$^3$ apply.

In a metering device according to an exemplary embodiment, the microvalve can be formed to change, based on a control signal, from a completely closed state to a completely open state and to dispense the predetermined amount of lubricant over a dispensing time. The microvalve can be formed, for example, such that it dispenses the predetermined amount of lubricant as long as it is in the completely open state.

In exemplary embodiments the microvalve can in principle also be designed as a sealing control valve, so that it can also assume more than the completely open and the completely closed state. The microvalve can therefore be designed to at least partially allow a control or regulation of the predetermined amount of lubricant through a change of the state of the microvalve, wherein the microvalve can assume at least one further defined state, which is different from the completely open and the completely closed state. A state is defined here if it is attainable through a targeted control of the microvalve for a definable period of time.

In other exemplary embodiments, the microvalve can also be designed to only be able to assume the completely open and the completely closed state. In other words, the microvalve may be a 2/2-way microvalve or also a stop valve.

Here a control signal can be effected for example electrically, mechanically, optically, or magnetically. It can be produced through a provision of a signal, through a change of a signal with respect to a characteristic value (e.g. a voltage value, a current value, an intensity, a field strength, a flux density) or also through an absence of such.

A metering device according to an exemplary embodiment can comprise a plurality of microvalves, wherein the plurality of microvalves comprise the microvalve, and wherein the microvalves of the plurality of microvalves are fluidly coupled with the outlet of the lubricant reservoir. Here the microvalves of the plurality of microvalves can also be embodied differently in exemplary embodiments. Thus for example, a microvalve of the plurality of microvalves can be formed as a sealing control valve; a further microvalve of the plurality of microvalves can be formed as a 2/2-way microvalve.

In this way, different machine parts or components can be supplied with a lubricant from a central lubricant reservoir via multiple microvalves.

A metering device according to an exemplary embodiment can further have a flow sensor, which is disposed and formed, so that a discharge flow of the lubricant is ascertainable, which discharge flow exits the lubricant reservoir through an outlet thereof and/or flows through the microvalve. The discharge flow here can be a volume or also a mass of an amount of the lubricant flowing through the microvalve. Similarly, it can also be a volume or a mass of the lubricant flowing out of the outlet of the lubricant reservoir.

The flow sensor here can, for example, use a mechanical-volumetric measurement method, a differential pressure measurement method or back pressure measurement method, a thermal method, an acoustic measurement method, a magnetic-inductive measurement method, an optical measurement method or a gyroscopic measurement method.

If the metering device has multiple microvalves, it can also have a plurality of flow sensors. Thus, a plurality of these microvalves can each be coupled with a flow sensor or a microvalve can be associated with a flow sensor so that for each microvalve, one lubricant flow is ascertainable independently from another lubricant flow.

The flow sensor can here provide or output a sensor signal, which comprises a piece of information regarding the flow rate.

In this way it can be possible to monitor the amount of lubricant dispensed through the microvalve and compare it with the predetermined amount of lubricant. In this way a verification or calibration of the metering device during operation can be made possible. A permanent monitoring and/or regulation of the predetermined amount of lubricant dispensed from the microvalve can also optionally take place.

Such a metering device according to an exemplary embodiment can further have a bypass conduit with a bypass valve, wherein the bypass conduit is connected parallel to the flow sensor, so that a flow of the lubricant through the flow sensor is partially or completely switchable to the bypass conduit via the bypass valve. The bypass conduit can thus be coupled with a first and a second connector of the flow sensor. The bypass valve can for example be a stop valve or a 2/2-way valve, which is disposed in the bypass conduit and thus can prevent the lubricant flow through the bypass conduit. It can also for example be a 3/2-valve, wherein the lubricant flow is reciprocally switchable between the flow sensor and the bypass valve. If the metering device has more than one microvalve and more than one flow sensor, it can also have a bypass conduit with a bypass valve for more than one flow meter, thus for example for some or all flow sensors.

Hereby a reduction of flow resistances or also a removal of the load of the flow sensor can be achievable if necessary, which can optionally contribute to a prolongation or conservation of the flow sensor.

In a metering device according to an exemplary embodiment, the lubricant reservoir can have a piston biased with a spring element or a membrane biased with a spring element, wherein the piston or the membrane is disposed so that it can put pressure on the retained lubricant, wherein a spring element can comprise a compression spring, a tension spring, an air spring, a gas pressure spring, a torsion spring, a torsion bar spring, a spiral spring or an elastomeric spring or another spring type. In a metering device according to an exemplary embodiment, the lubricant reservoir can be formed so as to exert the pressure onto the retained lubricant. Depending on the spring type used, different spring geometries can be used, i.e. for example coil springs, barrel springs, disc springs or also leaf springs, to name only a few examples. Thus an external pressure source, i.e. for example a pump or a compressed air supply, can optionally be omitted.

In a metering device according to an exemplary embodiment, the lubricant reservoir can include a media connector for a medium subjected to an external pressure or for a pumped medium, wherein the media connector is fluidly coupled with a first partial volume of the lubricant reservoir, the lubricant reservoir comprises a second partial volume to retain the lubricant, and the first and the second partial volumes are fluidly coupled with each other.

The first and the second partial volumes are coupled with each other in terms of pressure, so that a pressure built up in one of the two partial volumes is transferable to the other partial volume. If it is, for example, a gaseous medium, such as air or another gas or mixture of gasses, the two partial volumes can be connected directly, i.e. for example in a common vessel or pressure container or through pipe or hose connections. If for example a separation of the medium from the lubricant is advisable or necessary, in order for example to reduce or prevent contamination of the lubricant, in exemplary embodiments a movable or deformable separating body can be disposed between the first partial volume and the second partial volume, i.e. for example a movable or deformable membrane or a movable piston, wherein the separating body is formed to prevent or to reduce a direct contact of the medium in the first partial volume and the retained lubricant.

As the embodiments using movable separating bodies show, in exemplary embodiments the first and the second partial volumes can be variable with respect to their size or volume values.

In this way it is optionally possible to provide a larger lubricant reservoir, since an additional installation space for pressure-generating components or devices (e.g. pumps) can be eliminated.

In such a metering device according to an exemplary embodiment, the medium can be gaseous, and the lubricant reservoir can have a valve unit, which is formed to make the media connector of the lubricant reservoir separable from the first partial volume and to make an excess pressure in the first partial volume relievable. The valve unit can for example have a defined leakage, through which the gaseous medium can be transferred to the environment or to a collection or removal system. In this way an easier maintenance or an easier filling or refilling of the lubricant reservoir with the lubricant can optionally be made possible.

In a metering device according to an exemplary embodiment, the lubricant reservoir can have a filling level sensor, which is formed to make a stored amount of the lubricant retained in the lubricant reservoir ascertainable, and to transmit a sensor signal comprising a piece of information regarding the stored amount to a control unit, and/or wherein the lubricant reservoir has a pressure sensor, which is formed to make a pressure of the lubricant retained in the lubricant reservoir ascertainable, and to transmit a sensor signal comprising a piece of information regarding the pressure to the control unit.

In principle any type of sensor can be used as the filling level sensor, i.e. for example an optically, mechanically, thermally or electrically operating sensor. Depending on the specification profile, in different exemplary embodiments the sensor signal can here simply indicate a falling below or an exceeding of the stored amount relative to a threshold value. In other words, relative to the stored amount the sensor signal may only comprise the information that the stored amount has fallen below or exceeded a threshold value, wherein the threshold value is predetermined, programmable, or changeable.

In other exemplary embodiments the filling level sensor can also be formed to provide a sensor signal that comprises further information regarding the stored amount. Thus the filling level sensor can for example comprise information regarding the stored amount, which information can comprise or take the form of continuous values, quasi-continuous values or a plurality of different, discrete values between a minimal and a maximal value.

Also a pressure sensor can be suitably embodied using different technologies. Such a pressure sensor can for example be embodied as a piezoresistive pressure sensor, as a piezoelectric pressure sensor, as a frequency-analog pressure sensor, as a Hall element pressure sensor, as a magnetoresistive pressure sensor, as a capacitive pressure sensor or as an inductive pressure sensor.

This sensor also can be formed such that it can simply provide a falling below or an exceeding of a threshold value or also further information in the context of the sensor signal. Therefore the statements made above with respect to a pressure or pressure value of the retained lubricant in the lubricant reservoir also apply to these sensors.

In this way an operation of the machine to which the metering device is connected or coupled can optionally be safer, since a disturbance, an error or also a pending need for maintenance can be recognizable at an early stage.

A metering device according to an exemplary embodiment can comprise a metering apparatus wherein the metering apparatus comprises the microvalve and the metering apparatus is spatially separable from the lubricant reservoir. In such an exemplary embodiment the microvalve can be disposed as close as possible to a to-be-lubricated machine part of a machine. In this way supply paths, in which lubricant is lost due to leaks or other unwanted effects, can be shortened, so that a supplying of lubricant is achievable with an improved accuracy. The lubricant reservoir can be attached at another place, at which more installation space may be available. In such a metering device according to an exemplary embodiment, the metering apparatus and the lubricant reservoir can spatially separable at least 0.5 m from each other. A metering device according to an exemplary embodiment thus can be embodied not only as a single system component. It can also be embodied with spatially separable individual components. Thus the metering device can for example be formed such that the metering apparatus and the lubricant reservoir are spatially separable from each other at least 0.5 m, at least 1 m, at least 2 m, at least 5 m or at least 10 m. In this way a better adjustment of the metering device to limiting conditions can be produced, which limiting conditions arise from the machine or its machine part or from other, e.g. legally-prescribed limiting conditions.

In such a metering device according to an exemplary embodiment, the lubricant reservoir can comprise a first housing and the metering apparatus can comprise a second housing different from the first housing. In exemplary embodiments the lubricant reservoir and/or the metering apparatus can thus each have a separate housing. The lubricant reservoir and/or the metering apparatus can in this way be disposed completely or at least partially in the relevant housing. In this way an easier integration into existing systems or machines can optionally result.

In such a metering apparatus according to an exemplary embodiment, the lubricant reservoir and the metering apparatus can each have a connector for a pipe conduit, in order to make the outlet of the lubricant reservoir connectable with the metering apparatus via a pipe conduit, wherein the connectors for the pipe conduit are formed to be able to receive a hollow cylinder-shaped pipe conduit having an outer and an inner diameter. In such a metering device according to an exemplary embodiment, the outlet of the lubricant reservoir and the metering apparatus can optionally be fluidly coupled with a pipe conduit, wherein the pipe conduit is designed as hollow and cylinder-shaped at least on the end facing the outlet of the lubricant reservoir and on the end facing the metering apparatus.

Through the provision of connectors for a pipe conduit, the lubricant reservoir and the metering apparatus can thus be connected using a pipe conduit. The pipe conduit is in this case formed at least in one section as a hollow cylinder with an inner and an outer diameter, especially in the area of the connectors. The inner and outer diameters are here adapted to the amount of lubricant to be transported and/or to the prevailing pressure conditions, i.e. for example to the pressure of the lubricant in the lubricant reservoir. Thus for example outer diameters between approximately 2 mm and approximately 20 mm can be used. In other exemplary embodiments the upper value of the outer diameter may be lower, for example at 15 mm, 10 mm, 8 mm or 5 mm. Thus for example a connector for a pipe conduit with an outer diameter of 2.5 mm can be provided.

The inner diameters result from a difference of the outer diameter and a doubling of a wall thickness of the pipe conduit. Depending on the outer diameter, the wall thicknesses of the pipe conduit can fall between 0.1 mm and 5 mm. Depending on the outer diameter used, the operating conditions and the field of application, the minimum value and maximum value of the wall thicknesses can vary independently of each other, as long as an infinitesimal (value 0) or even a mathematically negative inner diameter would not result. Among others, 0.2 mm, 0.3 mm, 0.5 mm, 0.8 mm, 1 mm, 1.2 mm, 1.5, 1 mm, and 2 mm can occur both as minimum and as maximum values.

In this case, a pipe conduit is manufactured, at least in one section along the pipe conduit, from a material that exhibits no or a negligible change of the inner and/or outer diameter under the applied pressures, so that no or only a negligible change in the inner volume of the pipe conduit results from a pressure drop or pressure increase that may occur in the pipe conduit. A change can then for example be negligible, if it is less than 25%, less than 10%, less than 5%, less than 2%, less than 1%, less than 0.5%, less than 0.2% or less than 0.1% with reference to an average or the smallest amount of lubricant, in order to reliably facilitate a supplying of the microvalve with the lubricant.

A hose line can also be used at least in one section, insofar as a certain amount of flexibility is required and no change or only a negligible change of an inner volume of the hose line or the relevant section is ensured through an appropriate choice of material of the hose line.

A metering device according to an exemplary embodiment can further have a control circuit, wherein the microvalve is formed to dispense, upon indication by the control signal, the predetermined amount of lubricant, wherein the control signal is coupled with the microvalve and is formed in such a way as to output the control signal to the microvalve. Further, if the metering device has a flow sensor, the control circuit can optionally also be coupled with it, and can be formed to receive the sensor signal from the flow sensor, and to provide the control signal based on the sensor signal. Thus the control signal can determine for example the delivery duration or also an opening duration or a closing duration of the microvalve on the basis of the sensor signal.

If the metering device optionally has a filling level sensor and/or a pressure sensor, the control circuit can optionally be formed to provide or output the control signal on the basis of one of one of these sensor signals. For example if the sensor signal shows that a sufficient amount of lubricant is not available in the lubricant reservoir, i.e. for example a lower threshold value of the stored amount is fallen below, or the pressure under which the lubricant is dispensed from the lubricant reservoir falls below a threshold value, a control signal can, if necessary, be omitted or withheld on the basis of this sensor signal.

Optionally the control signal can provide or output an error signal, which can include a piece of information that an error or a fault situation is present. Optionally the control circuit can also output the error signal such that this error signal has a piece of information as to what kind of fault or which error is present.

The control circuit can be embodied as a standalone component of the metering device, spatially separated from the lubricant reservoir and/or from the microvalve. However it can also be implemented as part of a metering apparatus, which also comprises the microvalve, or also as part of the lubricant reservoir. The control circuit can be embodied as part of a machine, for example as part of a machine tool, as a PLC circuit or as a separate control computer (PLC=Programmable Logic Controller).

In a lubricant system according to an exemplary embodiment, the machine part can comprise a rolling-element bearing, a sliding bearing, a linear motion bearing or a linear sliding bearing, wherein the machine part has a bore in a raceway or in a slide, wherein the bore is fluidly coupled with the microvalve, in order to dispense the predetermined amount of lubricant to the raceway or the slide path. The raceway or slide path can for example be that of an inner or an outer ring of a rolling-element bearing, but also that of a profiled rail unit or of a profiled rail.

The bore can in this case have a countersink, for example a profiled countersink, on the raceway or the slide of the rolling-element bearing, of the sliding bearing, of the linear motion bearing or of the linear sliding bearing, in order to improve a surface finish of the raceway or slide, to improve a sliding property of the sliding bearing or of the linear sliding bearing or to improve a rolling property of the rolling elements on the raceway of the rolling element bearing or of the linear motion bearing. Besides a countersink, however, the slide or raceway can also have other deburring.

In a lubricant system according to an exemplary embodiment, the microvalve can be coupled with the machine part via a through-extending conduit system, which upon a dispensing of the predetermined amount of lubricant exhibits no change or only a negligible change of a volume of the conduit system (inner volume). The through-extending conduit system can thus for example be manufactured from one or more materials, which exhibit no change or only a negligible change in the volume of the conduit system taking into account the applied pressures. A change can be negligible then for example if, it is less than 25%, less than 10%, less than 5%, less than 2%, less than 1%, less than 0.5%, less than 0.2%, or less than 0.1% with reference to an average amount of lubricant or the smallest amount of lubricant.

The through-extending conduit system can be embodied in multiple parts. Thus it can for example be one or several pipe conduit sections, one or several hose sections or conduits embodied in a larger workpiece in the form of bores. In this case it can for example be a capillary conduit.

The through-extending conduit system has however no section wherein the lubricant is transported across a gap. In particular such a conduit system has no nozzle, through which the lubricant is sprayed onto the machine part to be lubricated.

A dispensing of the predetermined amount of lubricant can hereby be improved if necessary, since even small changes of the inner volume of the conduit system can be disadvantageous for the precision in light of the small volumes.

Thus, in a lubricant system according to an exemplary embodiment, the outlet of the lubricant reservoir is fluidly coupled with the microvalve via a conduit system, which exhibits no change or only a negligible change of a volume of the conduit system (inner volume) upon a dispensing of the predetermined amount of lubricant.

In a lubricant system according to an exemplary embodiment, the metering device can comprise a metering apparatus, wherein the metering apparatus comprises the microvalve, and wherein the lubricant reservoir is disposed spatially separated from the metering apparatus. In such an exemplary embodiment the microvalve can be disposed as close as possible to a to-be-lubricated machine part of a machine. In this way, supply paths, in which lubricant is lost due to leaks or other unwanted effects, can be shortened, so that a lubricant supplying with an improved accuracy is achievable. The lubricant reservoir can be attached to another place at which more installation space may be available. In such a lubricant system according to an exemplary embodiment, the metering apparatus can is spatially separated at a distance from the lubricant reservoir, wherein the distance amounts to at least 0.50 m.

In a lubricant system according to an exemplary embodiment, the metering device thus can be embodied not only as a single system component. It can also be embodied with spatially separable single components, so that the metering apparatus and the lubricant reservoir are spatially separated in the lubricant system. The distance between these components can amount to at least 0.5 m, at least 1 m, at least 2 m, at least 5 m or at least 10 m. In this way an easier adaptation of the lubricant system to constructional, structural, organizational or legally-prescribed limiting conditions can be possible.

In a lubricant system according to an exemplary embodiment, the lubricant reservoir can be disposed in a dangerous materials cabinet, a dangerous materials space, a lubricant space or a lubricant cabinet. An oil cabinet for example represents an example of a lubricant cabinet or dangerous materials cabinet. In this way an easier adaptation of the lubricant system to structural, organizational or legally-prescribed limiting conditions can be possible.

In a lubricant system according to an exemplary embodiment, the machine part can be a high speed bearing or a bearing of a spindle, wherein the bearing of the spindle is formed to make possible a rotational speed of at least 20000 rpm. The bearing of the spindle can further be designed to make possible rotational speeds of at least 40,000 rpm or at least 60,000 rpm. Such a machine can for example be a machine tool. But also in the case of a high speed bearing this can be formed to make possible a rotational speed of at least 20000 rpm, of at least 40,000 rpm or at least 60,000 rpm.

An exemplary embodiment can also be implemented in the form of a program with a program code for the implementation of an exemplary embodiment of a method, if the program runs on a programmable hardware component.

Hereinafter exemplary embodiments are described and explained in more detail with reference to the accompanying figures.

Before exemplary embodiments are described in more detail in the context of FIGS. 1 to 15 and are explained in more detail with regard to their operation, it is appropriate to note that, in the context of the present description, consolidated reference numbers are used for objects, structures and other entities when several entities within an exemplary embodiment, or within several exemplary embodiments, or the relevant class of entities, which entities are equivalent to the relevant entity itself, will be discussed in more detail. In this way it is possible to keep the description more concise and shorter, as unnecessary repetitions can be avoided, as descriptions that relate to an entity are also transferable to other entities in other exemplary embodiments, insofar as this is not explicitly stated otherwise or is outside the context. In contrast to this, if individual entities are referenced, individual reference numbers are used, which are based on the corresponding consolidated reference numbers. Entities that occur multiple times in an exemplary embodiment or in different exemplary embodiments can in this way be set out identically or differently with regard to some of their technical parameters. For example it is possible that multiple entities within an exemplary embodiment can be set out as identical with regard to some parameters, however as different with regard to some other parameters.

DETAILED DESCRIPTION OF THE INVENTION

Figure 1:
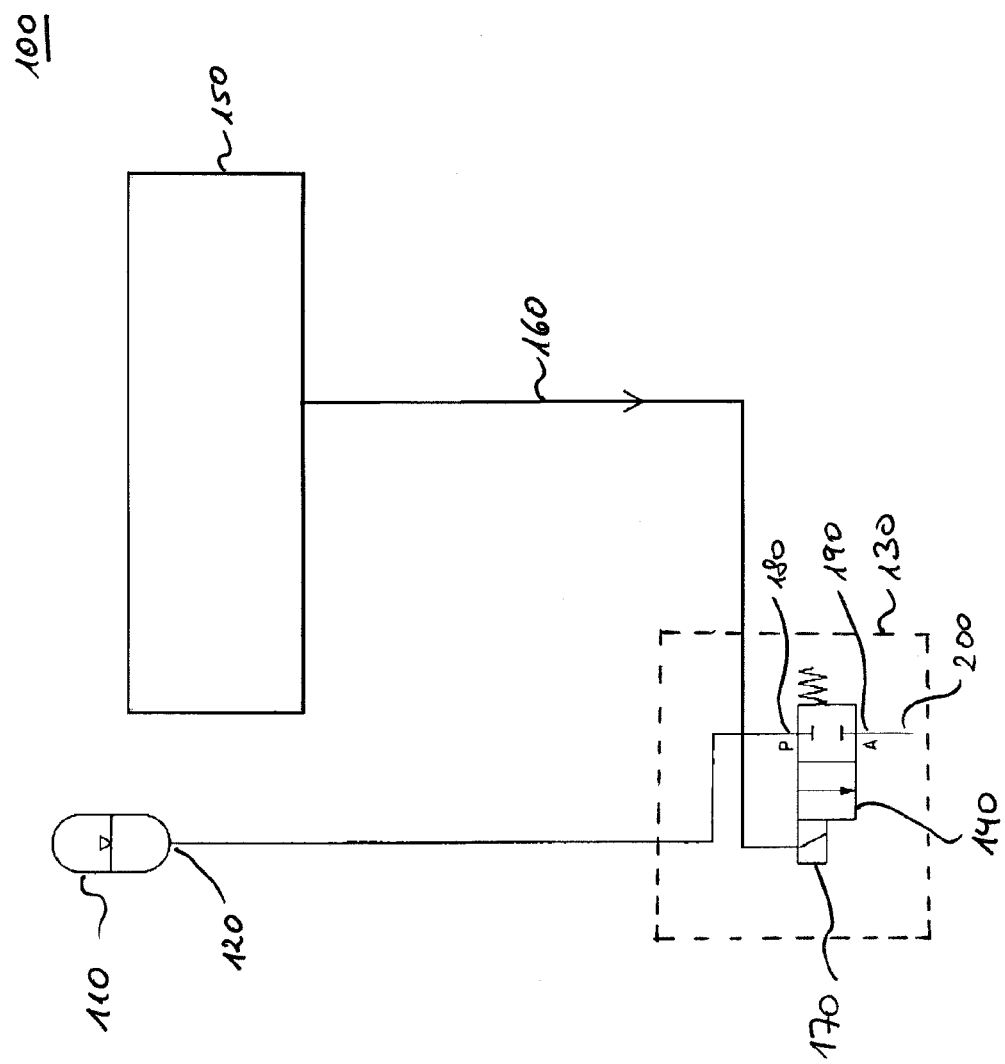
FIG. 1 shows a hydraulic plan of a metering device according to an exemplary embodiment.

FIG. 1 shows a hydraulic plan of a metering device 100 according to an exemplary embodiment. The metering device for dispensing a predetermined amount of lubricant thus comprises a lubricant reservoir 110, which is formed to accommodate a lubricant and dispense it via an outlet 120 of the lubricant reservoir 110. Besides the lubricant reservoir 110, the metering device further has a metering apparatus 130, which is also referred to as metering unit. The metering apparatus 130 comprises a microvalve 140, which is fluidly coupled on the input side with the outlet 120 of the lubricant reservoir 110. The microvalve 140 is further formed to dispense the predetermined amount of lubricant. The metering device 100 further comprises an optional control circuit 150, which is also referred to as electronic unit. The control circuit 150 is in this case coupled with the microvalve 140 so that the control circuit 150 can output a control signal to the microvalve 140. For this purpose the control circuit 150 is coupled via a control signal line 160 with a connector of an actuator 170 of the microvalve 140.

The outlet 120 of the lubricant reservoir 110 is in this case fluidly coupled with a first connector 180 of the microvalve 140, such that the lubricant, which is dispensed under pressure out of the lubricant reservoir 110, comes into contact with the first connector 180 (inlet) of the microvalve 140. A second connector 190 of the microvalve 140 is fluidly coupled with a connector 200 for a pipe conduit.

The microvalve 140 is in this case designed as a stop valve or 2/2 valve, which has two connectors 180, 190 and can assume two switching states or states. The two states are firstly a fully opened state and on the other hand a fully closed state. The microvalve 140, as it is shown in FIG. 1, is in this case designed such that it is in the fully closed state in the case of an absence of a control signal via the control signal line 160.

The connector 200 for the pipe conduit is in this case formed to be able to accommodate a hollow cylinder-shaped pipe conduit having an outer and an inner diameter.

As the lubricant, all liquid lubricants, i.e. for example oil, are in principle contemplated. But also, other lubricants having a sufficiently low viscosity (e.g. low-viscosity greases) can be dispensed using a metering device 100 according to an exemplary embodiment.

Figure 2:
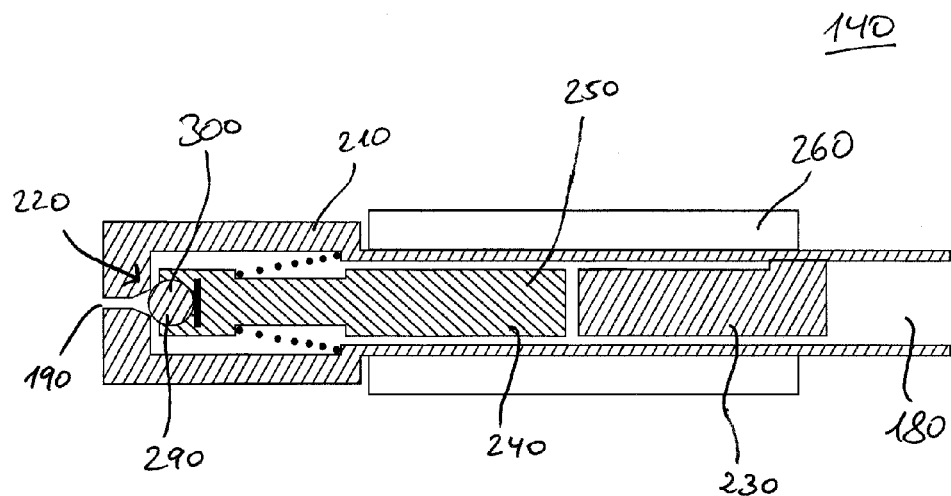
FIG. 2 shows a cross-sectional representation of a microvalve of a metering device according to an exemplary embodiment in a closed state.
Figure 3:
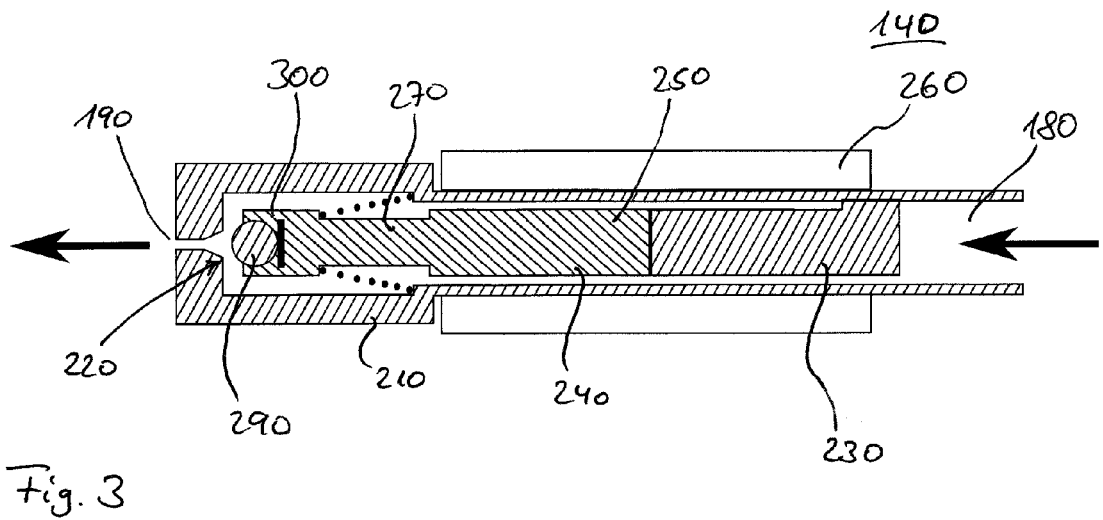
FIG. 3 shows a cross-sectional representation of the microvalve in an opened state.

FIG. 2 shows a cross-sectional representation of the microvalve 140 in a first state, in which the microvalve 140 is fully closed. In contrast to this, FIG. 3 shows the microvalve 140 in a fully opened state. The microvalve 140 has a housing 210 with a valve seat 220, which is located in the area of the second connector 190 of the microvalve 140. The second connector 190 is designed here as a nozzle.

In an interior of the microvalve 140, a stationary armature 230 is disposed and connected with the housing 210 in a mechanically stable way. The microvalve 140 further has a mobile armature 240, which is disposed in the interior of the microvalve 140 at least with a first section 250 adjacent to the stationary armature 230. The housing 210 is in this case designed rotationally symmetrical as a cylinder and is surrounded by a coil 260 at least in one area, in which the stationary armature 230 and the first section 250 of the mobile armature 240 are at least partially disposed. At least the first section 250 of the mobile armature 240 is in this case manufactured from a magnetic material, for example a ferromagnetic material, such that a magnetic force is applicable to the first section 250 via the coil 260.

The mobile armature 240 further has a second section 270, which tapers relative to the first section 250. A spring 280 (compression spring) is in this case disposed between a contact surface of the housing 210 and a contact surface of the second section 270 of the mobile armature 240 and is pretensioned, so that the mobile armature 240 is pressed by the spring 280 in the direction of the valve seat 220.

The mobile armature 240 further has a ruby ball 290 as a sealing body, which is mechanically coupled or connected via a ball holder 300 with the second section 270 of the mobile armature 240.

The microvalve 140 is a miniature solenoid valve, which is operated electromechanically and is directly traversed by the lubricant. In a currentless state, the ruby ball 290 is pressed against the valve seat 220 by the spring 280. In the currentless state the microvalve 140 is thus fully closed. This situation is represented in FIG. 2.

The valve seat 220 can in this case for example be manufactured from a hard material, for example from sapphire.

The microvalve 140 opens upon energizing the coil 260, since a mutual attraction of the two armatures 230, 240 results due to the generated magnetic field.

The amount of lubricant dispensed during an opening cycle is determined as a function of the pressure of the lubricant and the duration of the applied current pulse that is impressed on the coil 260 and in the present case represents the control signal. In other words the amount of lubricant dispensed through the second connector 190 is determined on the one hand by the pressure and on the other hand by the duration of the current pulse applied to the coil 260.

For the housing 210 as well as for the two armatures 230, 240, appropriate materials have been used that have a high chemical resistance to the lubricant used. As materials for the two armatures 230, 240 as well as for the housing, for example stainless steel is contemplated. The valve ball can for example be manufactured from ruby (ruby ball 290) while the valve seat 220 can be manufactured from sapphire.

This combination of materials for the armature 230, 240 and the housing 210 makes it possible to achieve not only a high chemical resistance, but also short response times, so that very short opening times and closing times of the microvalve 140 are realizable.

In the valve field, the above-mentioned materials enable it for example to achieve smallest opening strokes of less than $\frac{1}{100}$ mm and thereby simultaneously to make possible an extremely high wear resistance, which has a durable stable valve geometry as a result.

In this way it is possible to design the microvalve 140 in very small sized manner with a very small internal volume (e.g. 25 µl). Due to the small valve stroke, typical response times that fall in the range of the low 100 µs (e.g. 200 µs) result and thus facilitate maximum dispensing frequencies of up to several kilohertz (e.g. approximately 3 kHz). In this way minute amounts of lubricant dispensable from the microvalve 140 result, which fall in the range of the values mentioned previously above. For example it can even be possible, with the use of an appropriately low-viscosity lubricant, to achieve with a single opening pulse of 150 µs a minimum amount of lubricant, if necessary, of only 20 nl (at a pressure of 1 bar) or 50 nl. Which minimum amounts of lubricant are realizable depends not least on a multiplicity of factors, which for example also comprise a viscosity of the relevant lubricant. Depending on the specific design, if necessary very high repetition accuracy with deviations in the single-digit percent range or under (e.g. less than 0.2%) can be achieved.

The microvalve 140 is in this case closed when the coil 260 is switched to be currentless. However if the coil 260 is energized, i.e. the microvalve 140 opens, maximum flow amounts of multiple milliliters per minute can result (e.g. 8 ml/min with a pressure of the lubricant of 1 bar and an appropriately low viscosity).

Optionally the microvalve 140 can of course also be equipped with filter elements to prevent a blockage of the microvalve 140. Other designs can also be used for microvalve 140, as they can be used for example in the field of medical or water technology.

Figure 4:
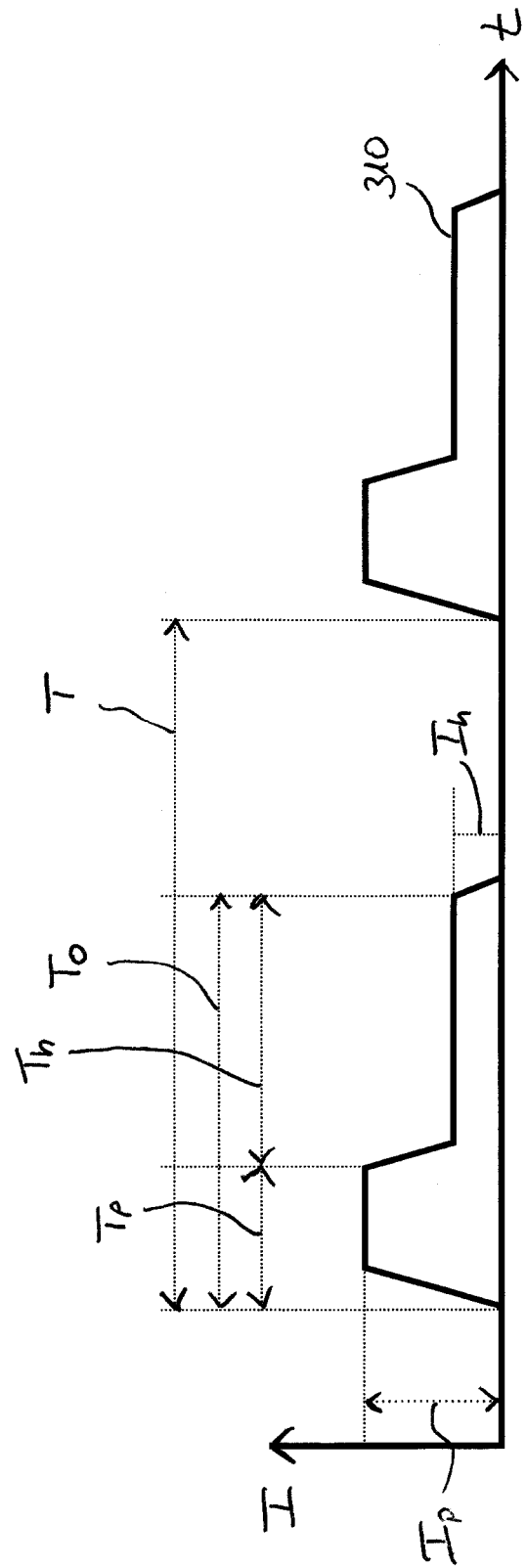
FIG. 4 shows a time progression of a control signal for the microvalve.

FIG. 4 shows a time progression 310 of a control signal, wherein a current I is applied over the time t in the progression shown in FIG. 4. The control signal is in this case formed to be periodic over time with a period duration or cycle time T. A valve opening time To is in this case shorter than the cycle time T. The lubrication pause results from the difference between the cycle time T and the valve opening time To.

To ensure a reliable opening of the microvalve 140, a peak current Ip is impressed over a peak time Tp immediately upon the opening of the microvalve 140, i.e. at the beginning of the valve opening time To, as a control signal for the actuator 140, i.e. the coil 260 of the microvalve 140. After the lapse of the time Tp, a holding current Ih of the coil 260 or the actuator 170 of the microvalve 140 is impressed for a holding time Th, which holding current Ih is calculated such that the mobile armature 240 is securely held in the opened state. In contrast thereto, the peak current Ip is chosen such that the mobile armature 240 is moved away as quickly as possible from its position in the closed state, so that therefore the ruby ball 290 reliably separates from the valve seat 220. The holding current Ih is in this case lower than the peak current Ip, in order to prevent an unnecessary heating of the coil 260 or the microvalve 140.

The valve opening time To results from the sum of the peak time Tp and the holding time Th, as is also shown in FIG. 4. These times often fall in the range of a few 100 µs, while the associated currents fall in a range of a few 100 mA.

Figure 5:
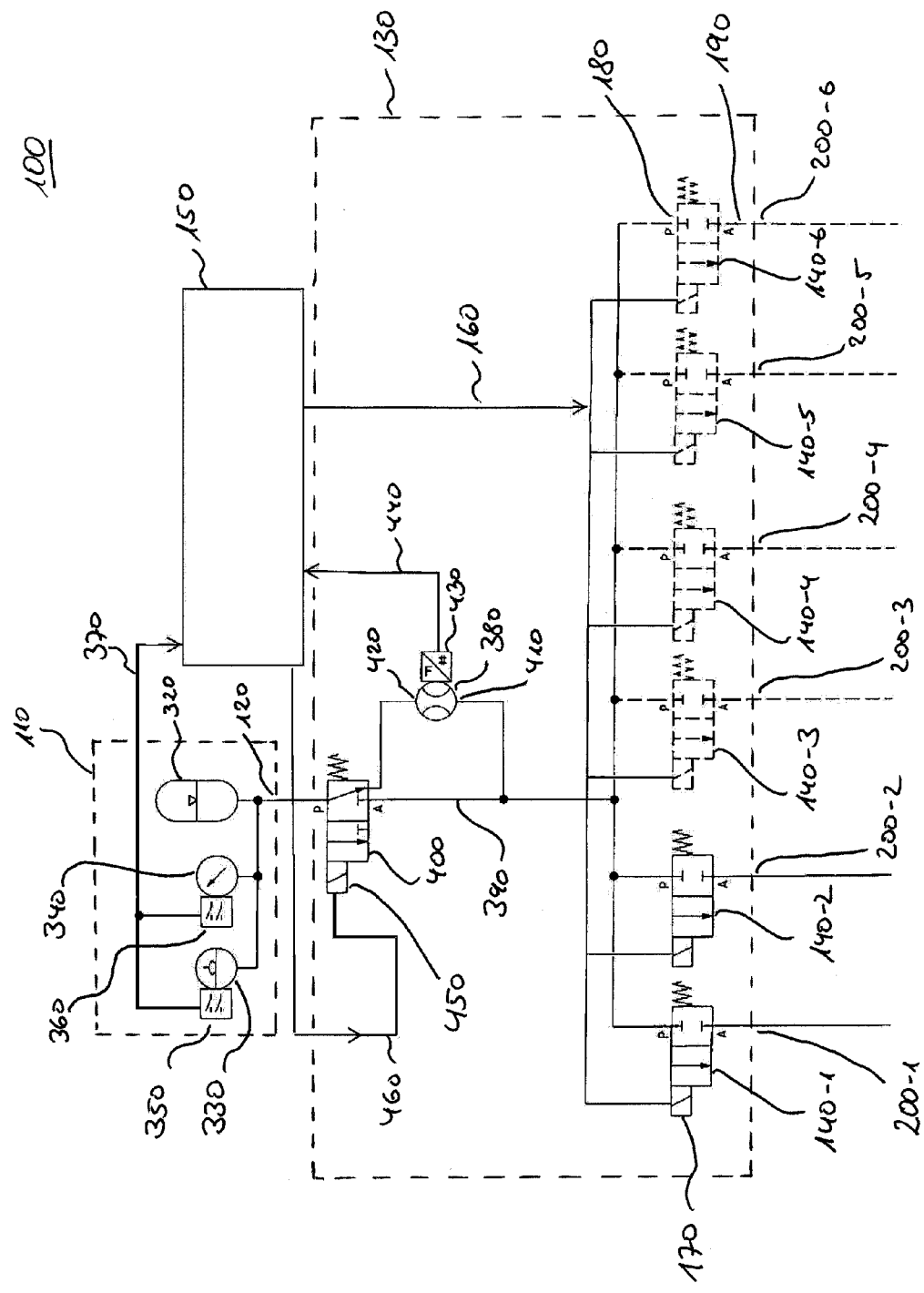
FIG. 5 shows a hydraulic plan of a metering device according to a further exemplary embodiment.

FIG. 5 shows a hydraulic plan of a metering device 100 according to a further exemplary embodiment. The metering device 100 shown in FIG. 5 also comprises again a lubricant reservoir 110 as well as a metering apparatus 130. The lubricant reservoir 110 comprises a container 320 which holds the actual lubricant, as well as an optional filling level sensor 330 and an optional pressure sensor 340. Both the filling level sensor 330 and the pressure sensor 340 are fluidly coupled with the outlet 120 of the lubricant reservoir 110. The filling level sensor 330 as well as the pressure sensor 340 can of course also be disposed in an interior of the container 320.

The filling level sensor 330 comprises a sensor circuit 350, which is coupled with the control circuit 150 so that this sensor circuit 350 can transmit a sensor signal to the control circuit 150, which signal comprises a piece of information regarding a stored level of the lubricant in the lubricant reservoir 110 or its container 320.

In an analogous manner, the pressure sensor 340 also has a sensor circuit 360, which is formed and is coupled with the control circuit 150 such that it can also transmit a sensor signal to the control circuit 150, which signal comprises a piece of information regarding a pressure of the lubricant in the lubricant reservoir 110 or in the container 320 or in the outlet 120.

The sensor circuits 350, 360 are in this case coupled with the control circuit 150 via a sensor signal line 370. In this case, similar to the control signal line 160 from FIG. 1, it can be an optical, electrical or a different type of signal line. The two sensors 330, 340 can also be coupled with the control circuit 150 via a common sensor signal line 370 or via different sensor signal lines. In the case of a common sensor signal line 370, communication with the control circuit can for example take place using an appropriate communication protocol (e.g. TCP/IP).

The metering device 130 comprises, in contrast to the exemplary embodiment shown in FIG. 1, a plurality of microvalves 140-1, 140-2, ..., 140-6. In this case the exact number of the microvalves 140 can be different in different exemplary embodiments of a metering device 100. Thus a corresponding exemplary embodiment can comprise for example a single microvalve 140, but also multiple microvalves 140, i.e. for example two microvalves, three microvalves, four microvalves or more. For this reason only the first two microvalves 140-1 and 140-2 are represented with solid lines in FIG. 5, while the further four microvalves 140-3, ..., 140-6 are represented in a dashed manner as optional microvalves. If necessary the metering apparatus 130 can also be formed in exemplary embodiments such that this metering apparatus is retrofittable or expandable with further microvalves 140.

The microvalves 140 are each fluidly coupled with the outlet 120 of the lubricant reservoir using a first connector 180. For simplification of illustration, the first connector 180 is drawn only in connection with the microvalve 140-6 and is designated as such. Accordingly, the microvalves 140 each also have a second connector 190, which however is marked as such with a reference number only in connection with the microvalve 140-6. The respective second connectors 190 are fluidly coupled with the corresponding connectors for pipe conduits 200-1, ..., 200-6, in order to be able to dispense the lubricant to a pipe conduit or another conduit system.

Also in this exemplary embodiment, the actuators 170 of the microvalves 140 are coupled via a control signal line with the control circuit 150 in such a way that these actuators can receive a control signal from the control circuit 150. For simplification of illustration also in FIG. 5, only the actuator 170 of a single microvalve, namely of the microvalve 140-1, is marked here as such with a reference number.

In the exemplary embodiment of a metering device 100 shown in FIG. 5, the first connectors 180 of the microvalve 140 are each fluidly coupled with a flow sensor 380 and are each fluidly connected with an outlet of a bypass valve 400 via a bypass conduit 390. More specifically the first connectors 180 of the microvalves are fluidly coupled with a second connector 410 of the flow sensor 380, wherein the second connector 410 serves as the outlet of the flow sensor 380 in the metering device 100 shown in FIG. 5. A first connector 420 of the flow sensor 380 is coupled with a first outlet of the bypass valve 400.

Also the bypass conduit 390 is—as was mentioned previously—fluidly coupled with the first connectors 180 of the microvalve 140. Furthermore the bypass conduit 390 is coupled with a second outlet of the bypass valve 400. An inlet of the bypass valve 400 is fluidly coupled with the outlet 120 of the lubricant reservoir 110.

The bypass valve is in this case formed to establish a fluid connection either with the bypass conduit 390 or the flow sensor 380. The bypass valve 400 is therefore a 3/2 valve with three connectors (one inlet and two outlets) and two states, in which either the inlet is fluidly coupled with the first outlet or the inlet is fluidly coupled with the second outlet of the bypass valve 400. In other words a flow of the lubricant through the bypass valve can be partially or, as in the present case, fully switched between the bypass conduit 390 and the flow sensor 380. The bypass conduit is also referred to as bypass conduit; the bypass valve 400 is also referred to as bypass valve.

The flow sensor 380 has a sensor circuit 430, which is coupled with the control circuit 150 via a sensor signal line 440 in such a way that the sensor circuit 430 can provide a sensor signal, which comprises a piece of information regarding a discharge flow, to the control circuit 150.

Accordingly, the bypass valve 400 also has an actuator 450, which is coupled with the control circuit 150, in order to be able to receive a control signal via a control signal line 460, which signal causes a switching of the bypass valve 400. The control circuit 150 provides the actuator 450 with the control signal during the operation of the metering device 100.

Figure 6:
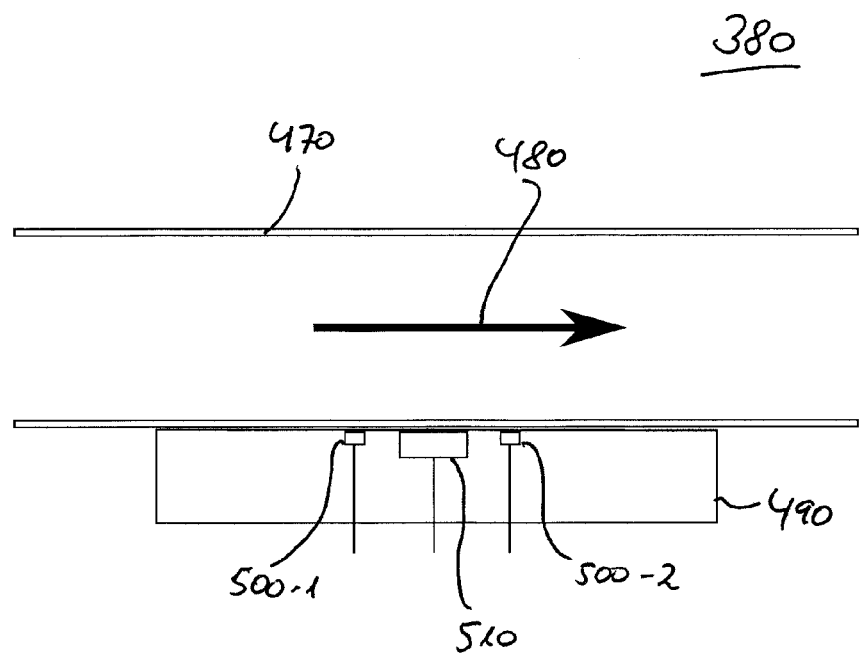
FIG. 6 shows a cross-sectional representation of a flow sensor.

FIG. 6 shows a simplified cross-sectional representation of the flow sensor 380 as can be used for example in connection with the metering device 100 from FIG. 5. The flow sensor 380 comprises a conduit segment 470, through which the lubricant can flow, as is indicated by arrow 480 in FIG. 6. External to the conduit segment 470, but adjacent to it, a sensor support 490 is attached, which can be a circuit board or also a chip (e.g. semiconductor chip). The sensor support 490 comprises two temperature sensors 500-1 and 500-2, between which a heating element 510 is centrally and symmetrically disposed.

If the heating element 510 is now heated during the operation of the flow sensor 380, the heat that the heating element 510 generates is also transmitted to the lubricant that may be flowing through the conduit segment 470, which heats the lubricant. If the lubricant now moves through the conduit segment 470, i.e. a flow of the lubricant through the conduit segment 470 is thus present, the two temperature sensors 500-1 and 500-2 will measure different temperatures. From a temperature difference between the temperature values, which the two temperature sensors 500 measure, a flow speed can be determined or calculated, taking into account the heat transferred to the lubricant from the heating element 510 on the basis of the known geometry of the conduit segment 470.

If, in contrast to the above-mentioned case, the lubricant does not flow through the conduit segment 470, the heat released by the heating element 510 will spread symmetrically to both sides of the heating element 510, i.e. to both temperature sensors 500 symmetrically, so that no temperature difference, i.e. identical temperatures, will be detected.

Purely for the sake of completeness, it should be mentioned at this point that FIG. 6 merely shows a simplified representation of a flow sensor 380, which representation in particular does not depict the sensor circuit 430. This sensor circuit can for example also be integrated onto the sensor support 490. Of course the corresponding sensor circuit can also be embodied as a separate circuit, which can also be disposed in a spatially separated manner.

Figure 7:
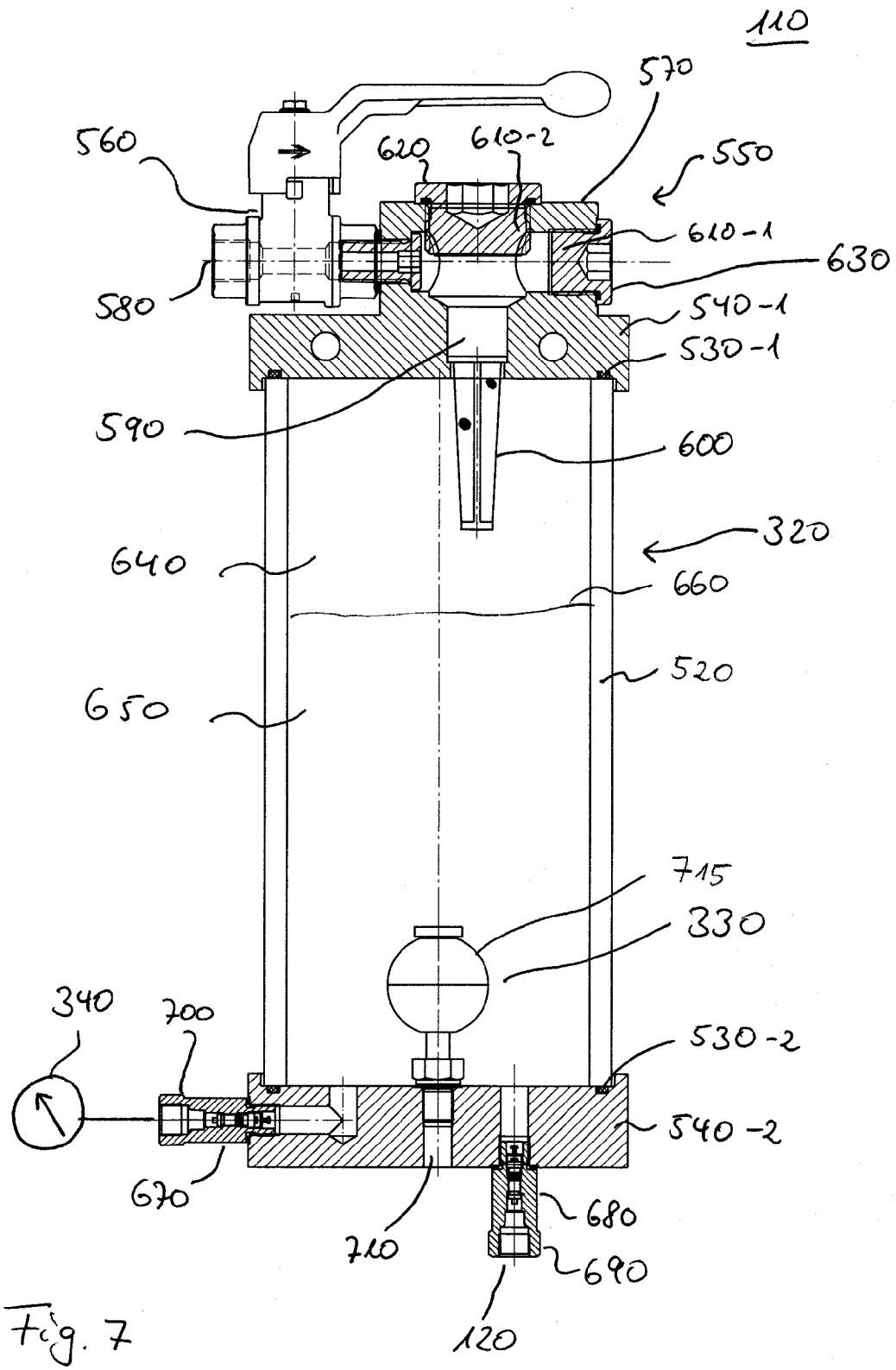
FIG. 7 shows a cross-sectional representation of a lubricant reservoir of a metering device according to an exemplary embodiment.

FIG. 7 shows a cross-sectional representation of a lubricant reservoir 110, as it can be used for example within the context of the previously shown exemplary embodiments.

The lubricant reservoir 110 comprises a hollow cylinder 520, which can be manufactured for example from borosilicate glass. Sealed closing components 540 connect to both sides of the hollow cylinder 520 along its cylindrical axis via seals 530-1, 530-2, which closing components together with the hollow cylinder 520 form the container 320 of the lubricant reservoir.

More specifically, the lubricant reservoir 110 has an upper closing component 540-1 and a lower closing component 540-2, which are disposed on opposite sides of the hollow cylinder 520. The upper closing component 540-1 has a valve unit 550, which in turn comprises a stopcock 560 and a manifold connector 570. The stopcock 560 has a media connector 580, at which a medium is injectable into the lubricant reservoir under an extreme pressure.

Furthermore, the stopcock 560 is coupled with the manifold connector 570 in such a way that the medium pressing against the media connector 580 can enter into the manifold connector 570 when the stopcock 560 is disposed in its open state.

Besides a connector, with which the manifold connector 570 is connected to the stopcock 560, the manifold connector 570 also has a bore 590, via which the medium can flow into an internal volume of the container 320. In this case, in order to prevent contamination or an ingress of foreign bodies into the container 320, a coarse filter 600 is connected with the bore 590 such that the inflowing medium must pass this coarse filter before it reaches the container 320.

Moreover, in the variant shown in FIG. 7, the manifold connector 570 has two further connectors 610-1 and 610-2. The coarse filter 600 serves, for example, not only to filter the medium flowing in via the stopcock 560, wherein it can concern for example pressurized air, compressed air or another gas or mixture of gases under pressure, but it is also suited to filter the lubricant; the connector 610-2 opposite the course filter 600 can also serve for example to fill or refill the lubricant reservoir 110 with the lubricant. In this case for example a closing screw 620 can be formed as a lubricant refill screw or as a closing screw of a lubricant refilling spout.

The pressurized, for example gaseous, medium can therefore reach the interior of the container 320 via the media connector 580 and via the valve unit 550. The stopcock 560 serves in this case to make the media connector 580 separable from the container 320. Moreover the valve unit 550 can also be formed in such a way as to make an excess pressure in the volume of the manifold connector, and if necessary also in the volume of the container 320, exhaustable by providing the valve unit 550 with a defined leakage, through which a small amount of the medium can escape. To achieve this, the connector 610-1 can for example be closed with a defined leakage 630, i.e. for example a closing screw having a defined bore or another leakage. Even if this, if necessary, leads to a wastage of the medium during the normal operation of the metering device 100, a servicing of the lubricant reservoir 110 or a refilling of same, if necessary, can be facilitated in this way.

Of course the arrangements and/or functions of the stop screw 620 and the leakage 630 can also be reversed in different exemplary embodiments.

The container 320 forms a first partial volume 640 and a second partial volume 650 that are coupled with each other with respect to pressure. In the exemplary embodiment shown in FIG. 7 the two partial volumes 640, 650 are not separated from each other using a specific component, although this is possible in the case of other exemplary embodiments. In the present exemplary embodiment, the two partial volumes 640, 650 are instead separated from each other such that the second partial volume 650 is completely filled with the lubricant, while the first partial volume 640 denotes an area above a level 660 or a surface of the lubricant of the container 320. The two partial volumes 640, 650 are hence in the present case not fixed partial volumes of the container 320 with fixed volume levels, but instead differ in terms of their function.

Therefore the stopcock 560 separates the media connector 580 from the first partial volume 640 in the case of a corresponding position of the stopcock 560. Of course the stopcock 560 can also connect or fluidly couple the media connector 580 with the first partial volume 640.

The lower closing component 540-2 has a lateral outlet 670 and a lower outlet 680, wherein in different exemplary embodiments, if necessary one of the two outlets 670, 680 also can be omitted.

In the exemplary embodiment shown in FIG. 7 the lower outlet 680 is used as outlet 120 of the lubricant reservoir 110. Accordingly, this exemplary embodiment has a connector for a pipe conduit 690, by which for example a spatial separation of the lubricant reservoir from the metering apparatus 130 is possible. However this is an optional component, which for example in the case of an alternative embodiment of the lower closing component 540-2 can also be omitted.

In the exemplary embodiment shown in FIG. 7 the lateral outlet 670 also has a connector for a pipe conduit 700, to which the pressure sensor 340, which is merely schematically represented in FIG. 7, is connectable. As was already explained in connection with the connector 690, the connector for the pipe conduit 700 can if necessary also be embodied differently or omitted, if for example an alternative implementation of the closing component 540-2 is used. Thus for example the pressure sensor 340 can be directly embodied as part of the closing component 540 or can be directly connectable with this closing component by bypassing a pipe conduit.

Moreover the lubricant reservoir 110 represented in FIG. 7 further has a filling level sensor 330, which is disposed in the interior of the container 320 and can provide a sensor signal through a bore 710 via a sensor signal line 370 (not illustrated in FIG. 7) of the control circuit 150 (not illustrated in FIG. 7). The filling level sensor 330 is designed as a float switch 715, which outputs a sensor signal when the level 660 of the lubricant falls below a certain prescribed level. This can take place for example by an opening or also a closing of an electrical circuit. The filling level sensor 330 thus transmits a piece of information regarding the amount of stored lubricant to the control unit 150.

The medium that is pushable into the lubricant reservoir 110 via the media connector 580 is typically provided as a gaseous medium. Pressurized air or compressed air is often introduced. However other gaseous media can be used. These include all gases or gas mixtures which are suitable in connection with the lubricant and all of the materials used for the metering device 100. These include for example nitrogen but also noble gases (e.g. helium, neon, argon), provided there is a corresponding need. The gaseous medium is in this case typically introduced under a pressure of several bar (e.g. 4-6 bar) to the media connector 580. Oil is often used as the lubricant.

If other combinations of lubricant and medium are taken into consideration, if necessary it can be advisable to use a separable or deformable separating body in the form of a membrane or a piston between the first and the second partial volumes 640, 650, to prevent an interaction, reaction, or mixing of the medium and the lubricant if necessary.

Due to the described arrangement and design of the lubricant reservoir 100, it can be used without the wastage of the medium—apart from a loss through the optionally—implemented optional leak 630.

If for example no external pressurized medium is available, in exemplary embodiments a pressure generation can also be effected within the framework of the lubricant reservoir 110.

The lubricant reservoir 110 can thus have a piston biased by a spring element or a membrane biased by a spring element, wherein the piston or the membrane is disposed such that this piston or this membrane can put the retained lubricant under pressure. The spring element can for example comprise a compression spring, a tension spring, a gas pressure spring, a torsion spring, a torsion bar spring, a spiral spring or an elastomer spring or another spring type. Thus the lubricant reservoir 110 can be formed to exert the pressure on the retained lubricant. Depending on the type of spring, different spring geometries can be used, i.e. for example coil springs, barrel springs, disc springs or also leaf springs to name only a few examples. Hereby an external pressure source can thus optionally be omitted, i.e. for example a pump or a compressed air supply.

Before a metering unit 130 shall be described in greater detail in connection with FIGS. 9 to 11 using three different sectional representations in different planes, a contextual representation of this metering unit shall first be explained in connection with FIG. 8.

Figure 8:
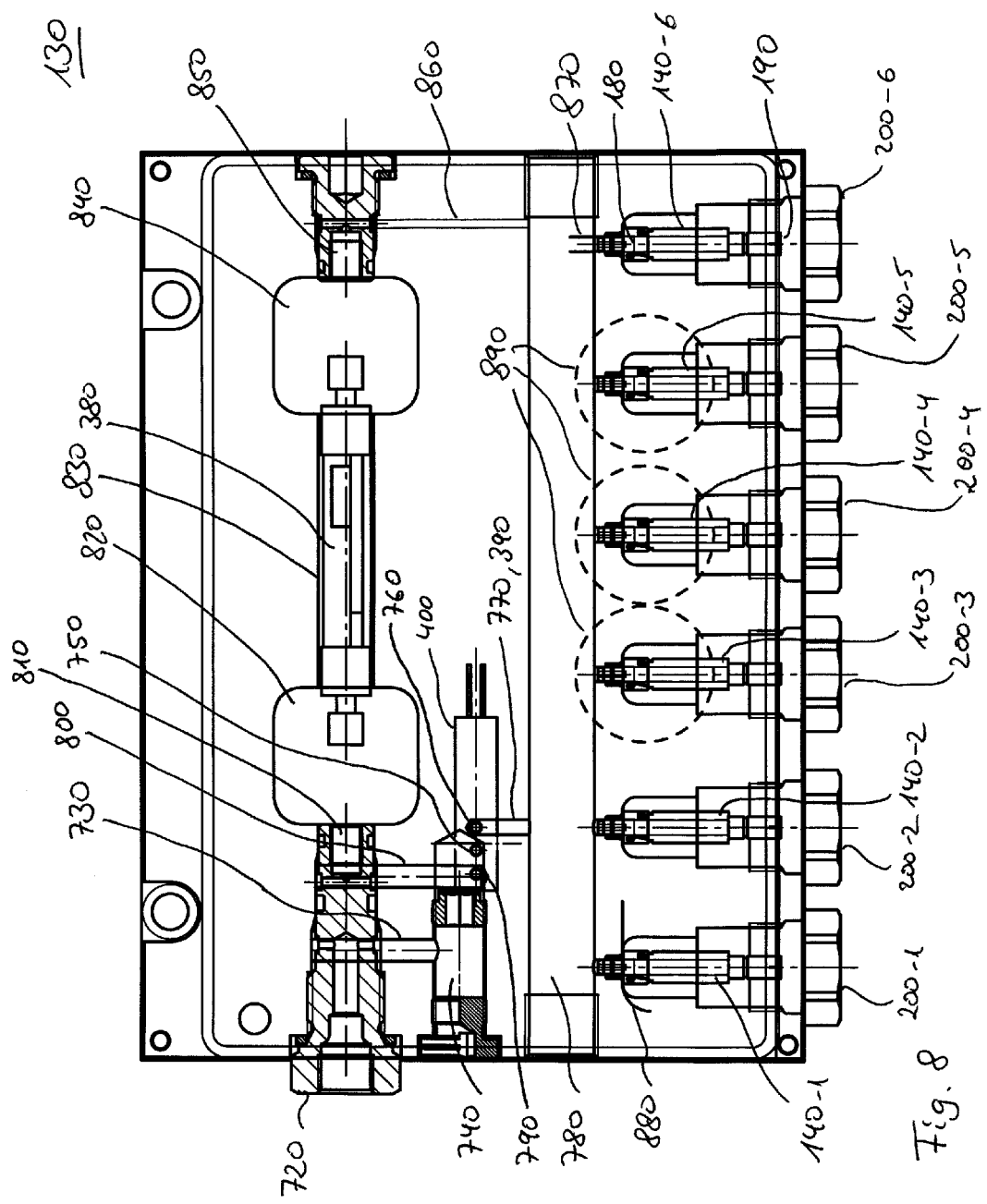
FIG. 8 shows a conceptual representation of a metering apparatus of a metering device according to an exemplary embodiment.

FIG. 8 shows a metering apparatus 130, which is spatially separable from the lubricant reservoir 110. Since the inner structure of the metering apparatus 130 is comparatively complex, as is to be described in further detail in connection with FIGS. 9 to 11, the fundamental structure in the context of the conceptual representation indicated there shall first be explained in connection with FIG. 8.

The metering apparatus 130 has a connector 720 for a pipe conduit, which is coupleable with the outlet 120 of the lubricant reservoir 110. The metering apparatus 130 can thus receive the lubricant from the lubricant reservoir 110 via the connector 720. Via a conduit 730, the lubricant provided at the connector 720 is first transferred to a volume 740, which volume provides the lubricant to the bypass valve 400 via a bore 750. In a typical position of the bypass valve 400 for the normal operation (English: normally open), it connects the bore 750 with a further bore 760, which leads the lubricant via a conduit 770 into an intermediate volume 780. The further bore 760 is thus typically open in normal operation.

During the operation of the metering device 100 or the metering apparatus 130, however, the bypass valve 400 also can redirect the lubricant flow to a further bore 790, which discharges into a conduit 800. This state of the bypass valve 400 can be assumed for example only in response to a corresponding control signal. The further bore 790 is thus closed in normal operation (English: normally closed). The conduit 800 discharges in turn via a short intermediate supply line 810 into a first hollow space 820, to which in turn a further bore 830 connects. The flow sensor 380 is disposed in the interior of the bore 830. It can in this case be advisable to seal the flow sensor 380 relative to the bore 830.

The bore 830 and the flow sensor 380 disposed in it lead to a second hollow space 840, which in turn is fluidly coupled with a conduit 860 via an intermediate conduit 850. The conduit 860 is formed as a bore 911 and leads in turn to the intermediate volume 780.

Thus the lubricant—depending on the setting of the bypass valve 400 can either reach the intermediate volume 780 directly via the conduit 770 or can reach the intermediate volume 780 via the loop via the flow sensor 380. In other words the conduit 770 represents the bypass conduit 390.

Via supply conduit bores 870, of which, to simplify the representation of FIG. 8, only the supply conduit bore 870 of a single microvalve 140-6 is marked with a reference number, the lubricant can be provided to the input side of the microvalves 140. In other words the supply conduit bores 870 direct the lubricant to the first connector 180 of the microvalve 140, of which in FIG. 8 altogether six, namely the microvalves 140-1, ..., 140-6, are represented. The second connectors 190 of the microvalves 140 discharge in turn to connectors 200 for pipe conduits, through which the lubricant then can be dispensed to the location to be lubricated or the machine part to be lubricated.

Here also for the simplification of the representation, only the first and second connector 180, 190 of the sixth microvalve 140-6 are marked as such with reference numbers.

For the electrical supply of the microvalve 140, in principle different design variants can be used. Thus FIG. 8 shows an indicated channel 880, through which the electrical lines for the supply and control of the microvalve 140 are led. Alternatively or also additionally the electrical leads can also be led to the microvalves 140 via the bores 890.

Figure 9:
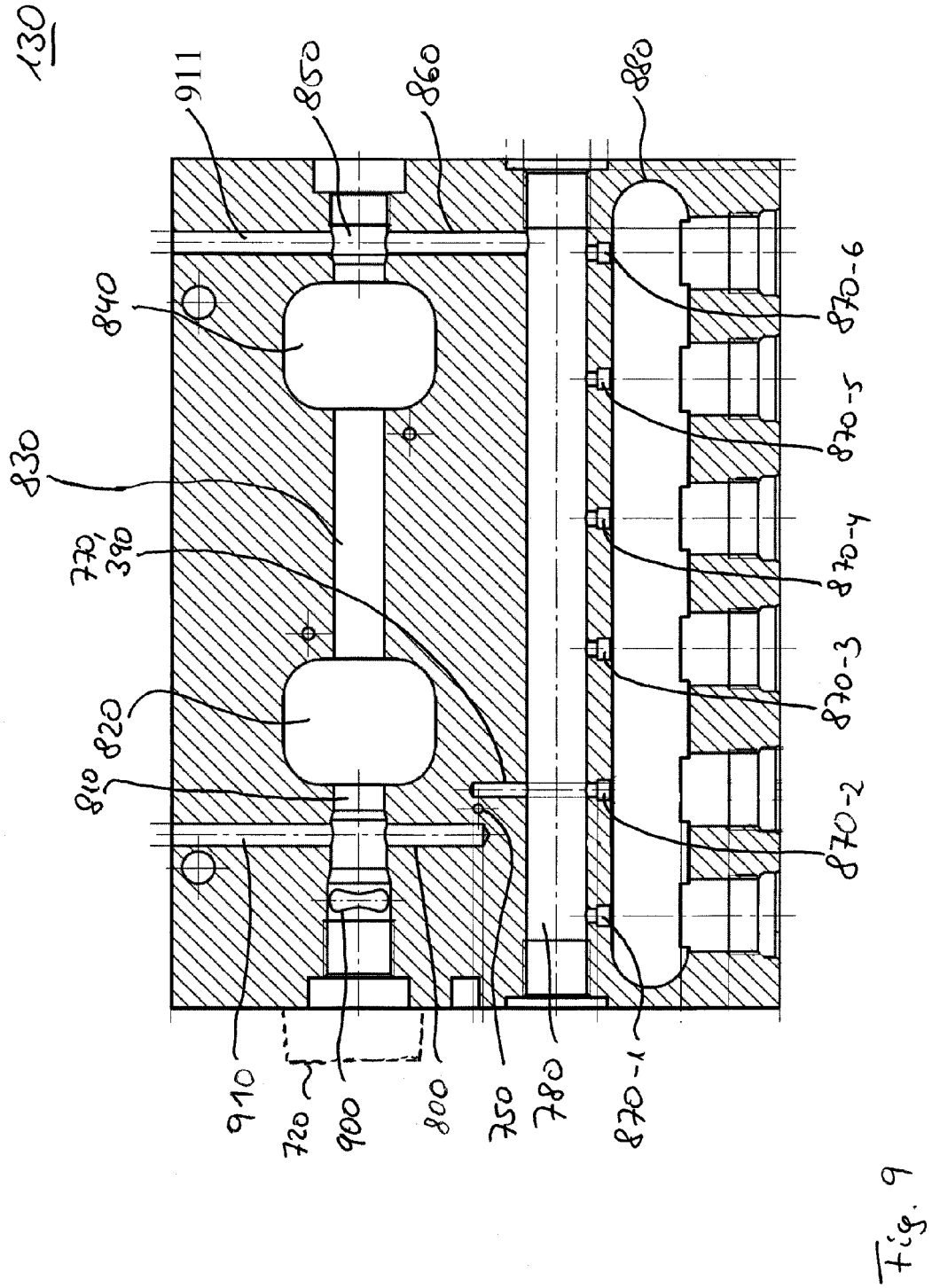
FIG. 9 shows a first cross-sectional representation of a metering apparatus of a metering device according to an exemplary embodiment.
Figure 11:
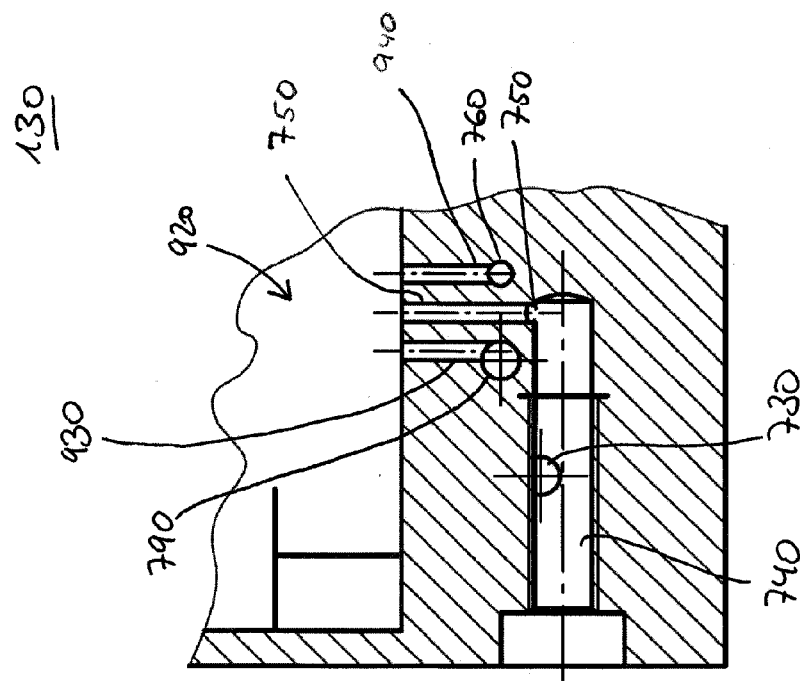
FIG. 11 shows a third cross-sectional representation of the metering apparatus from FIG. 9.
Figure 10:
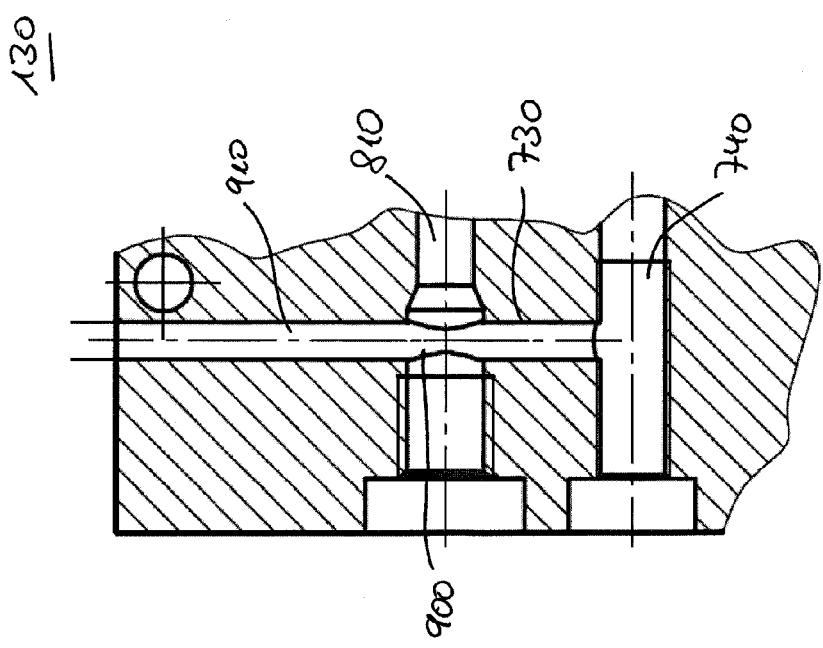
FIG. 10 shows a second cross-sectional representation of the metering apparatus from FIG. 9.

FIGS. 9, 10 and 11 each show the metering apparatus 130 in a cross-sectional representation in three different planes that are mutually perpendicular to each other. FIGS. 10 and 11 show only a part of the relevant structures. In the representation of FIGS. 9 to 11, the sensors as well as the valves are not shown. Instead only the bores and other structures of the metering apparatus 130 are shown. The depictions of FIGS. 9 to 11 illustrate only the complex interplay of the individual bores, conduits, and channels. Here attention should be directed in particular to the details not illustrated in FIG. 8.

Starting from the connector 720 for a pipe conduit, which connector is drawn only in a dashed manner in FIG. 9, through which connector the lubricant is provided for the metering apparatus 130, this lubricant reaches the conduit 730 via a figure 8-shaped opening 900 (see FIG. 10). The conduit 730 extends into the interior of a body, in which the metering apparatus 130 is formed. For this reason a manufacturing-necessitated bore 910 is shown, which is sealed after completion of the mechanical production, for example using a ball or another seal.

FIG. 11 shows an enlargement of the area into which the lubricant is introduced via the conduit 730 and is further distributed. To start with, FIG. 11 thus shows the volume 740 as well as the bore 750, which transports the lubricant to the bypass valve 400 not shown in FIG. 11. FIG. 11 shows, however, an installation space 920, into which the bypass valve 400 is introducible and will be mounted. Depending on the position of the bypass valve 400, the lubricant can then reach the further bore 790 via a bore 930 or reach a further bore 760 via a bore 940, which directs the lubricant via the two hollow spaces 820, 840 to the flow sensor 340 not shown in FIGS. 9 to 11, or directly into the intermediate volume 780.

Finally FIG. 9 further shows the design of the supply conduit bores 870 of the total of six microvalves 140, which also are not shown in FIG. 9, as well as the channel 880 for the electrical supply and control of the microvalves 140.

Because of the above-described typical transport volumes, the bores typically have diameters that fall between 1 mm and approximately 10 mm, typically between approximately 2 mm and approximately 5 mm, i.e. for example at approximately 2.8 mm and 4.3 mm.

Of course different numbers of microvalves are provided in different exemplary embodiments. Similarly the variations described in the introduction can be varied in different exemplary embodiments with respect to the specific design.

Figure 12:
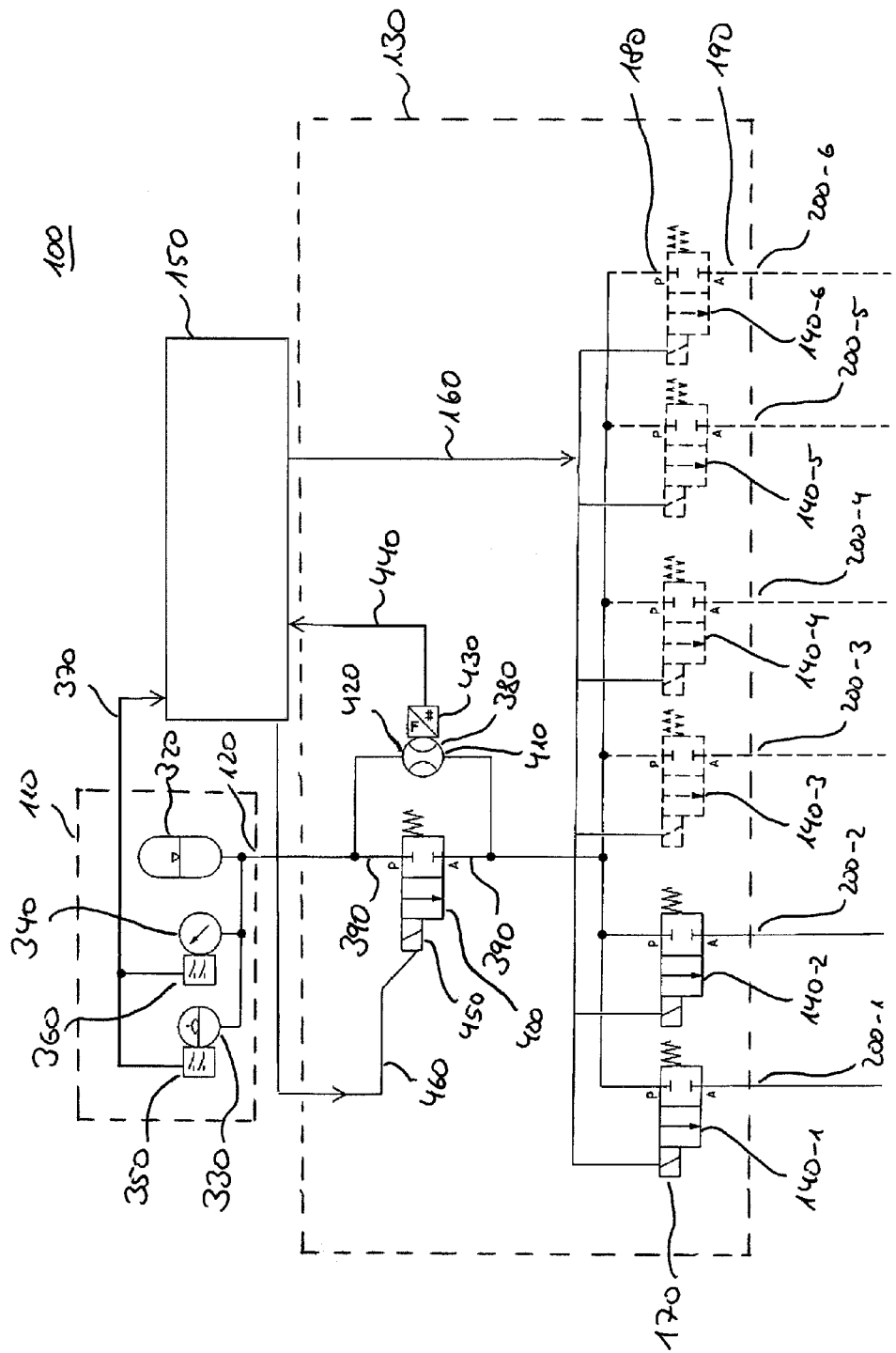
FIG. 12 shows a hydraulic plan of a metering device according to a further exemplary embodiment.

FIG. 12 shows a hydraulic plan of a further exemplary embodiment of a metering device 100, which differs from the exemplary embodiment shown in connection with FIGS. 5 to 11 only with regard to the design of the bypass conduit 390, of the bypass valve 400 and with regard to the flow sensor 380 with regard to its arrangement and its fluid coupling. For this reason, reference is hereby made to the description of the hydraulic plan from FIG. 5.

In contrast to the metering device 100, as it is shown in FIG. 5, the bypass valve 400 is designed in the present case as a 2/2 valve. It is fluidly connected to the bypass conduit 390 and lies parallel to the flow sensor 380. Thus, in the exemplary embodiment of a metering device 100 or a metering apparatus 130 shown in FIG. 12, the first connector 420 of the flow sensor 380 is coupled with the outlet 120 of the lubricant reservoir 110 and is coupled via a section of the bypass conduit 390 with the input of the bypass valve 400. Correspondingly the second connector 410 of the flow sensor 380 is coupled with the first connectors of the microvalves 140 and is coupled via a further section of the bypass conduit 390 with the outlet of the bypass valve 400.

In contrast to the hydraulic plan shown in FIG. 5, this arrangement and design of the bypass valve in principle allows a continuous flow of the lubricant through the flow sensor 380. A complete switching of the flow is not possible in this exemplary embodiment.

Instead, the bypass valve 400 is formed here to shift the flow of the lubricant partially to the bypass conduit 390 as the actuator 450 opens the bypass valve 400 in response to a corresponding control signal. In this way a rapid filling of the connected lubrication points or machine parts is possible via the microvalves 140 upon starting up the metering device 100. The connections for pipe conduits 200 or—generally speaking—the lubricant outputs are individually adjustable for each output with regard to a volume flow. The metering device 100 shown in FIG. 12, which is also referred to as minute amount metering unit, has a monitoring unit in the form of the flow sensor 380 for all volumetric flow rates. The bypass valve 400, which is also referred to as bypass valve, can facilitate the already-mentioned, rapid filling.

Also in this exemplary embodiment, the filling level and the pressure in turn can be monitored and/or detected by the filling level sensor 330 and the pressure sensor 340. Besides the control of the microvalves 140, the control circuit 150 can also undertake the control of the bypass valve as well as the flow monitoring. It can be formed as an electronic unit with a microprocessor for the control and monitoring of the valves and the volumetric flow rates. As was already explained previously, it can be embodied additionally or alternatively also as part of a machine tool, as part of an external control or an SPS or the PLC control (SPS=Programmable Logic Controller=(English) Programmable Logic Controller=PLC).

Figure 13:
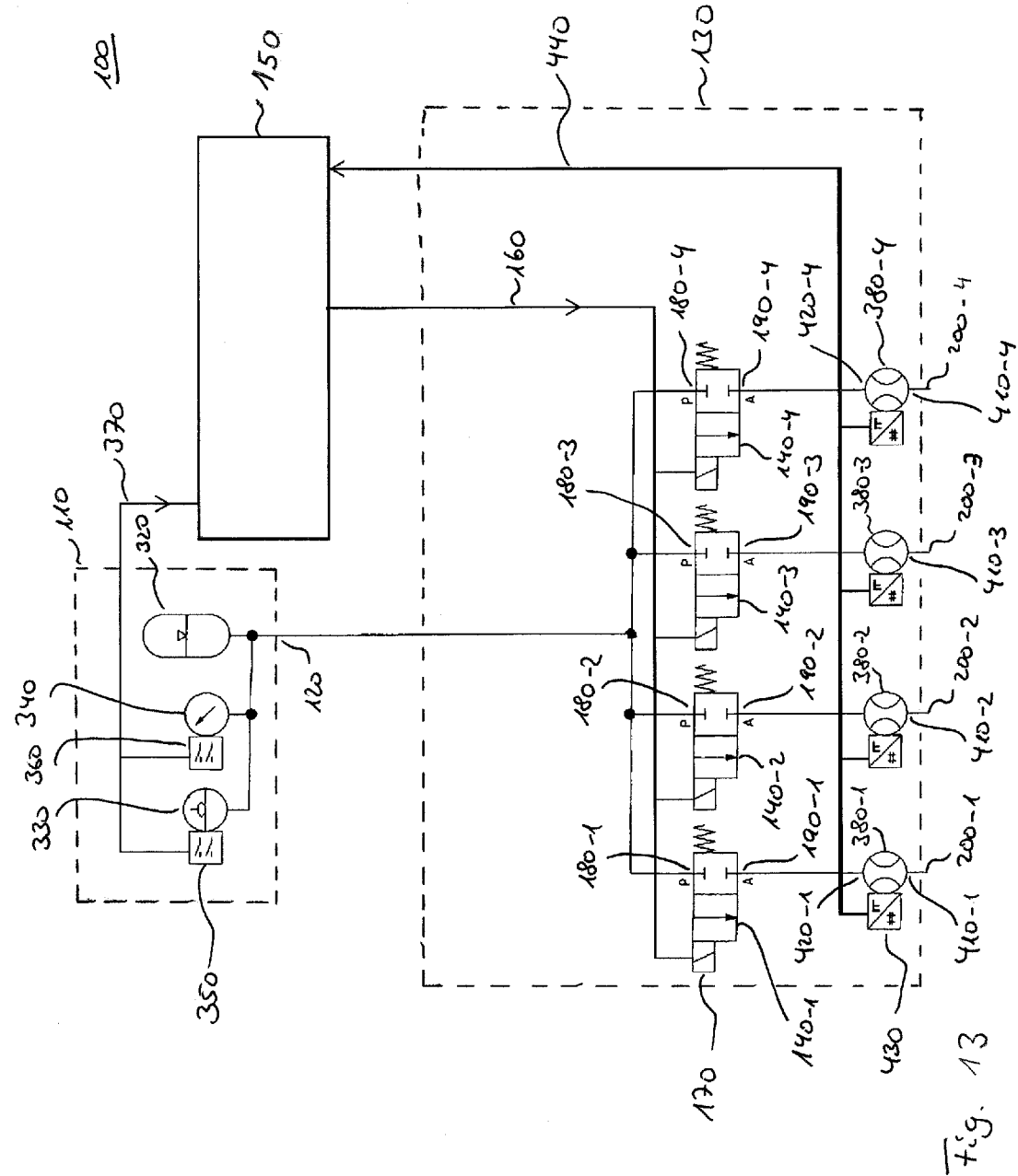
FIG. 13 shows a hydraulic plan of a metering device according to a further exemplary embodiment.

FIG. 13 shows a further exemplary embodiment of a metering device 100, which differs in essence from the exemplary embodiment shown in FIGS. 5 and 12 in that a common flow sensor 380 is no longer used in this exemplary embodiment, but instead an individual flow sensor 380 is used for each of the lubricant outlets. In this way it is possible to individually control and make the volumetric flow rate for each outlet more precisely adjustable. In other words FIG. 13 shows an exemplary embodiment of a metering device 100, i.e. a minute amount dispensing unit, having a monitor for each individual volumetric flow rate and/or lubricant outlet.

Thus the exemplary embodiment shown in FIG. 13 of a metering device 100 differs in comparison to that shown in FIG. 12 exclusively with respect to the metering apparatus 130. Thus in the exemplary embodiment shown in FIG. 13, the outlet 120 of the lubricant reservoir 110—except for parts of a conduit system—is directly fluidly coupled with the first connectors 180 of the microvalves 140. Moreover, in the exemplary embodiment of a metering device 100 shown in FIG. 13, the number of microvalves relative to the exemplary embodiment shown in FIG. 12 is reduced by two microvalves from six to four microvalves 140-1, . . . , 140-4, which again illustrates the flexibility with respect to the number of implemented microvalves 140 in different exemplary embodiments of a metering device 100.

At each of the second connectors 190-1, . . . , 190-4 of the microvalve 140, a flow sensor 380-1, . . . 380-4 is fluidly coupled with a respective first connector 420-1, . . . , 420-4. Correspondingly, the connectors for pipe conduits 200-1, . . . , 200-4 are each fluidly coupled with the second connectors 410-1, . . . , 410-4 of the flow sensors 380.

Therefore the exemplary embodiment of a metering device 100 shown in FIG. 13 also has no bypass valve 400 and no bypass conduit 390. In alternative exemplary embodiments, however, these can be fully implemented for individual or multiple flow sensors 380. Where appropriate, it can also be advisable in different exemplary embodiments to not equip each of the microvalves 140 with an independent flow sensor 380. Thus where appropriate it can be advisable to provide a common flow sensor 380 to a subset of the microvalves 140, which common flow sensor 380 can optionally also be equipped with a bypass valve and a bypass conduit. In this way it may be possible where appropriate to supply multiple machine parts, which need only be lubricated collectively, with lubricant in parallel and thereby simultaneously to save the costs of increasing flow sensors 380. Where appropriate it can also be advisable to operate a number of microvalves 140 completely without a verification by a flow sensor 380.

The flow sensors 380 each have a sensor circuit 430, and, for the sake of clarity in FIG. 13, only the sensor circuit 430 of the first flow sensor 380-1 is marked as such with a reference number. The sensor circuits 430 are coupled with the control circuit 150 via one or more sensor lines 440.

Even though connectors for pipe conduits, i.e. for example the connectors 200, were described in the context of the previously described exemplary embodiments, in other exemplary embodiments these can be replaced with other fluid couplings or conduits. Depending on the type of the connector, these can therefore be referred to more generally as inlets, outlets, or—collectively—as connectors.

Figure 14:
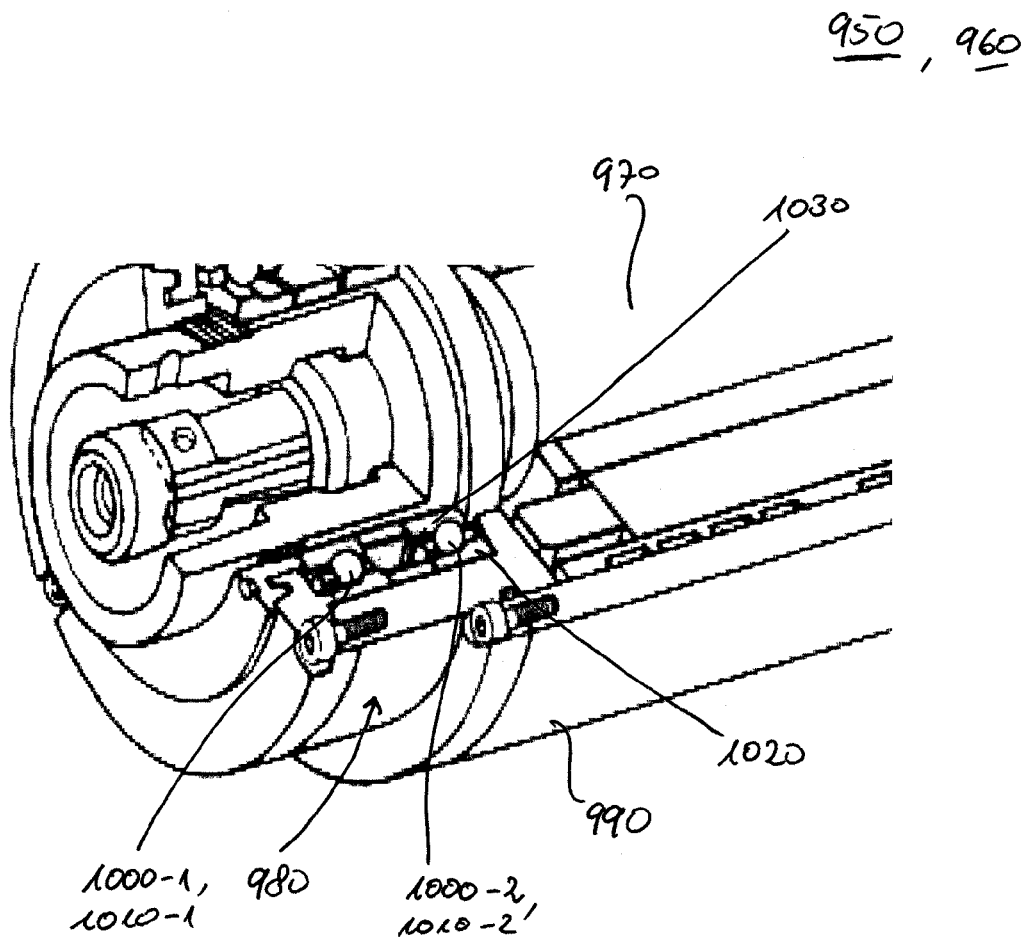
FIG. 14 shows a cutaway representation of a machine tool according to an exemplary embodiment.

FIG. 14 shows a perspective depiction of a machine 950, wherein it is a machine tool 960. In this case FIG. 14 shows, more specifically, a cutaway drawing in the area of a spindle 970 and its bearing unit 980, with which the spindle 970 is supported or guided relative to a housing 990 of the machine 950.

The bearing unit 980 is embodied as a floatingly-supported bearing (SLS) using two single row angular contact ball bearings, which respectively represent a machine part 1000-1 and 1000-2. The angular contact ball bearings represent specific embodiments of rolling-element bearings 1010-1, 1010-2. In different exemplary embodiments, different rolling-element bearings can also be used, for example deep groove ball bearings, cylindrical bearings or other rolling-element bearings.

In the present case the spindle 970 represents the rotating component, while the housing 990 is stationary. For this reason it can be advisable to introduce one or more bores into one or multiple raceways of the outer rings 1020, via which bores the lubricant will be brought directly onto the raceway of the rolling element bearing 1010 and thereby in direct contact with its rolling elements. Moreover, in some cases it can be advisable to provide the openings with a countersink or to deburr using another method, to facilitate an easier rolling of the rolling elements and to reduce the risk of a tilting of the rolling elements tilting relative to the corresponding raceway.

In the case of a stationary outer ring 1020, a raceway of an inner ring 1030 of a rolling-element bearing 1010 can be embodied if necessary without a corresponding bore. This can be otherwise, if in contrast to the exemplary embodiment shown in FIG. 14, the inner ring 1030 is stationary and the outer ring 1020 carries out a rotary movement relative to the inner ring. In such a case it can be advisable to introduce such bore(s) in the raceway of the inner ring 1030.

But also in the case of sliding bearing guides, it can be advisable to provide openings for the delivery of lubricant into the corresponding slide paths of the outer or inner rings.

Corresponding openings are however far from limited to bearings that are provided for the guiding of rotational movements. They are, rather, also used in the area of linear bearings, wherein a lubrication is possible in the area of sliding bearings as well as in the area of rolling-element bearings using the previously described openings in the slide paths or raceways.

Independent of the type of the bearing, the lubricant can be transported to the relevant openings or to the relevant bearings using a conduit system, which is fluidly coupled with the second connectors of the microvalves 140 or the corresponding connectors 200. Here the conduit system can comprise for example pipes or pipe sections, hoses or hose sections, as well as capillary conduits.

Figure 15:
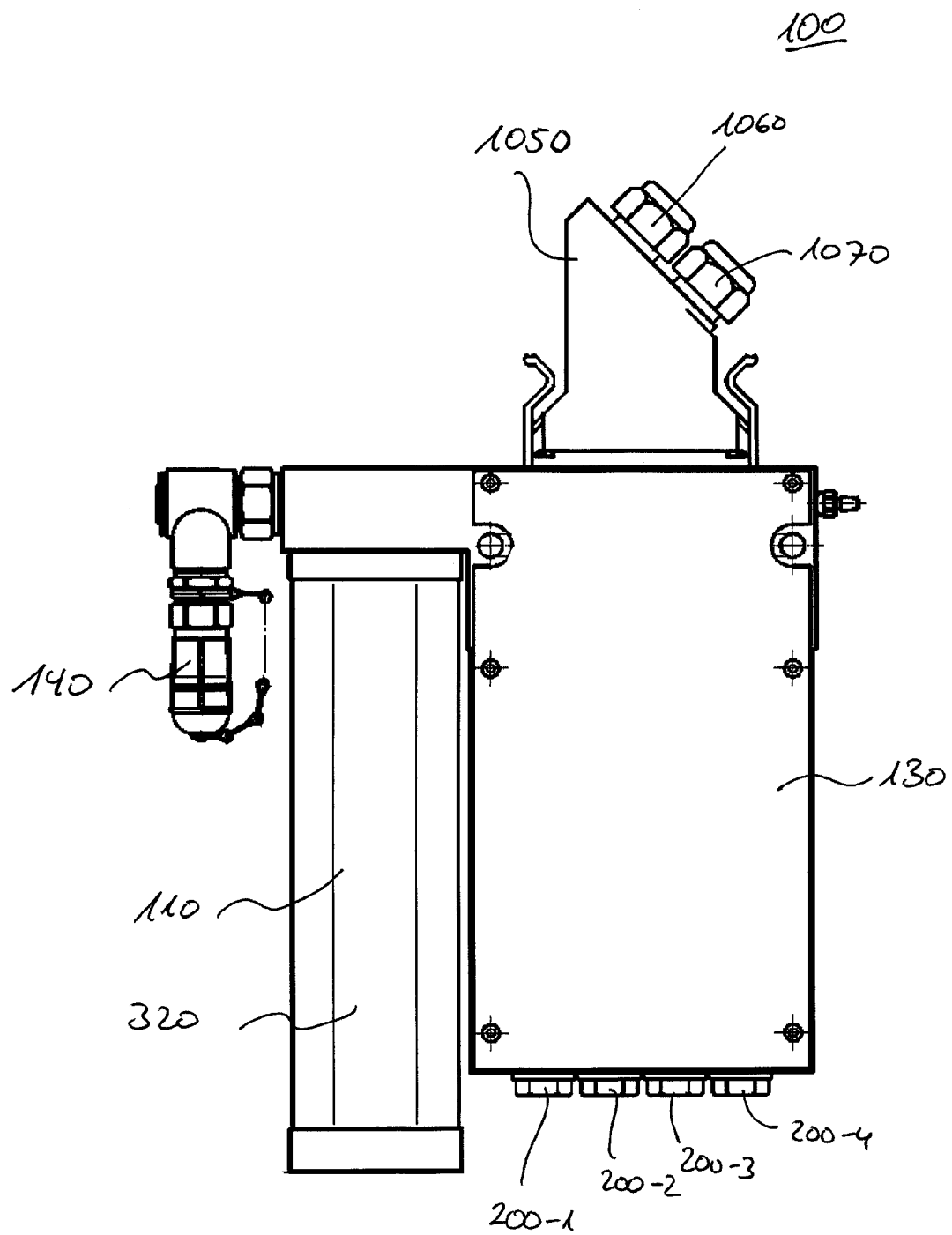
FIG. 15 shows an exterior representation of a metering device according to an exemplary embodiment.

FIG. 15 shows a metering device 100 according to an exemplary embodiment, wherein to start with, the lubricant reservoir 110 and the metering apparatus 130 are not spatially separated, but rather are implemented in the framework of a single housing. Depending on the specific design, the metering device 100 can however have a coupling system, which enables a separation of the lubricant reservoir 110 from the metering apparatus 130, so that these two subcomponents are also spatially separable. The two subcomponents can then if necessary once again be fluidly coupled using a conduit system or a pipe.

In the exemplary embodiment shown in FIG. 15, the lubricant reservoir 110 has a filling coupling 1040, which is also referred to as lubricant filling spout. This allows the lubricant to be introduced into the container 320, which is also referred to as lubricating agent container or lubricant container. The lubricant reservoir 110, which is referred to as oil reservoir due to the lubricant used, can be equipped with an internal or an external (pre-) pressure generator.

The metering apparatus 130 comprises a valve unit having four individually controllable precision valves or microvalves, which are not shown in FIG. 15 for purposes of clarity. Moreover it has a flow sensor unit with four flow sensors, as was already explained in connection with FIG. 13. These flow sensors are also referred to as flow sensors; the corresponding unit is referred to as a flow sensor unit. Accordingly, the metering apparatus 130 also has four connectors 200-1, . . . , 200-4 for the lubricant, which are also referred to as lubricant outputs or lubricant outlets.

Moreover the metering device 100 or the metering apparatus 130 has an electrical interface 1050 with a first connector 1060 for a supply voltage and a second connector 1070 for signal and control lines. Here it may where appropriate be advisable, in the case of a design of the metering apparatus 100 that makes possible a spatial separation of the lubricant reservoir 110 from the metering apparatus 130, to provide, besides a fluid coupling, also a corresponding sensor signal line coupling and/or control signal line coupling or a second corresponding electrical interface.

As was already initially explained, a metering device 100 is also referred to as a micrometering device or a micrometering system. The micrometering system can thus for example serve as an alternative to the classical oil+air lubrication. It is a lubricant metering system, through which multiple, for example up to four, six, eight or more, lubrication points can be supplied with minute amounts of oil from a common reservoir. The lubricant metering occurs through microvalves, which generate a homogeneous and virtually continuous volumetric flow rate with appropriate control. The continuous volumetric flow rate can be monitored by one or multiple sensors and periodically readjusted. Depending on the lubrication task the lubricant metering can also occur discontinuously.

For example in applications with a very high metering precision and with a continuous lubrication requirement, a precise metering of the smallest amounts (e.g. 0.5 to 5 mm$^3$/min), an immediate adjustment of the metered amounts or a direct metering onto the raceway(s) of the bearing can be employed. Application fields thus comprise a demanding lubrication of rapidly running spindles up to high rotational speeds (e.g. 20000, 40000, 60000 or more rotations/min) as well as high speed bearings. They can make do without consumption of air for the oil transport, which can mean a cost savings, since a complex installation of compressed air conduits can be reduced or completely avoided.

Similarly a risk of a blowing away of the oil film in the bearing, and a risk of the introduction of contaminants (e.g. particles, moisture) is significantly reduced. It can also facilitate a fast reaction time to a changed lubricant requirement, e.g. to changed spindle rotation speeds or changes to ambient temperature. An (expensive) special lubricant can in some cases be omitted. Different viscosities, temperatures or counter pressures can in some cases be internally compensated for by the system, so that a volume flow can flow evenly. Capillary conduits can lead directly to the running surface areas of the bearing. This can mean that an optimal utilization of minimal amounts of lubricant and a loss-free metering and immediate availability of the lubricant are achievable. A micrometering device or minute amount metering device (Engl Microdosage Unit) according to an exemplary embodiment can thus serve to lubricate fast running spindles in an air-free manner.

It can be used to realize individually adjustable lubricant microvolume streams in the nl and μl ranges. A consumption of auxiliary air for the transport of the lubricant can be avoided. A monitoring of multiple different lubricant flows with one monitoring unit is also possible. Very small, individually adjustable volume flows can thus be provided in a defined way. A transport medium, such as for example air, is not necessarily required. A monitoring unit for multiple volume flows can also be provided.

A micrometering system has an (oil) metering and supply system, through which multiple lubrication points can be continuously supplied with very small amounts of lubricant from a common reservoir. The lubricant metering occurs through special microvalves, which can generate a homogeneous and virtually continuous volume flow with appropriate control. The continuous lubricant flow be monitored and influenced via a flow sensor. Depending on the lubrication task the lubricant metering can also occur discontinuously. For the transport of the lubricant, no pressurized air is required as a transport medium. The lubricant must merely have a certain system pressure.

Typical application fields are found where very small amounts of oil are required (mounting, process control), where the precise and continuous supply of the lubricant is required (e.g. in high speed bearings and spindle bearings), where the prompt adjustment of the amount of lubricant is required in the lubrication process and where no air is available as a carrier medium or air is unsuitable. Compared with systems that use air as a medium for the homogenization of the oil metering and for the transport (OAA), exemplary embodiments can in some cases make possible as advantages no air consumption for the oil transport, no costs for the preparation of purified air, a direct, immediate system response to changed requirements, no blowing away of the oil film or no contamination (e.g. particles or humidity) through compressed air. The microvalves used for the micrometering can thus in some cases replace an oil-air lubrication, and make possible a flow monitoring for spindle lubrication, a continuous lubricant supply of spindle bearings, a monitored lubricant supply of spindle bearings and a regulated lubricant supply of spindle bearings or high speed spindle bearings.

A micrometering system can thus provide for a precise and continuous lubricant supply in the μl range. A precise metering of the lubricant in the smallest quantities and its continuous supply is required in the above-mentioned application scenarios. Exemplary embodiments can operate with such a high precision as would normally only be common in the medical and pharmaceutical fields. With such a system, up to four, six, eight or more lubrication points can be individually supplied with oil. It can be transported through capillary conduits, which can be led directly onto the running surfaces of the bearing. In this way, a precise and tailored lubricant supply as well as effective use of the lubricant in extremely small amounts is possible.

The lubricant metering occurs through microvalves, whose throughputs are individually controllable and which, depending on requirements, meter the lubricant intermittently or in a continuous volume flow. It can be individually adjusted for each lubrication point in a range from 0.5 to 5 μl/min. For comparison, a normal drop of oil has a volume of approximately 50 μl. A lubrication system according to an exemplary embodiment can thus meter amounts which correspond to $\frac{1}{100}^{th}$ to $\frac{1}{10}^{th}$ of a drop—and which extend over a minute. The lubricant container of the system is under pre-pressure and, in connection with the valve controlling, generates a defined oil volume stream. The system pressure generation can—depending on the system variant, occur internally through a compression spring piston or externally through a connector of compressed air. The variants with an internal system pressure generation can be recommended in cases wherein no compressed air is available on site. In the case of the external system pressure generation through compressed air, the connecter in fact serves only for maintenance of the pressure; no air is consumed.

To ensure that the volume flow remains constant, independent of pressure, temperature and viscosity, the system can be monitored with a flow sensor and readjusted through a PLC or machine control as appropriate. Thus it can be so achieved that no additional heat generation can occur in the spindle bearing due to uneven oil metering.

Compared to conventional oil+air lubrication systems, the micrometering system requires no expensive air for the oil transport. Consequently there is also no risk that the oil film will be blown away by compressed air. Nor can particles or moisture reach the lubrication point with the air.

Another advantage may lie in the fact that, due to the omission of air as the carrier medium, the system can change the lubricant amount as required in a highly dynamic way and thereby can directly react to oil need changes due to changing spindle rotation speeds or react to changes in the viscosity of the lubricant. Compared to conventional lubrication, the minimal amount of oil, with which the system operates, provides an additional contribution to protecting the environment. In addition, the system requires no expensive special lubricants. Commercial spindle oils, which are used in machine tools, can suffice. The micrometering system can be used anywhere where a precise supply of oil in the smallest amounts is required. Therefore not only on spindle bearings, but for example also in the automated parts assembly on conveyor belts and assembly lines.

Prototypes have shown that it is possible to make a micrometering device according to an exemplary embodiment, which micrometering device has the following technical data: lubricant: oil; capacities: 125 ml with internal pressure generation and 350 ml in an embodiment with auxiliary air having a pressure of more than 3 bar; metering: continuous 0.5-5 mm$^3$/min; outlets: 4; system pressure generation: internal or external (in an embodiment with auxiliary air having a pressure of more than 3 bar); output pressure: 1-3 bar; operating voltage: 12/24 DCV; Control: PLC/PLC-compatible; operating temperatures: 10 to 50° C.; operating viscosity: 20-200 mm$^2$/s; filling level monitoring: yes. It should be noted, however, that these technical data are only those of prototypes. Other exemplary embodiments can have different technical data, as the description above has also shown.

The constructed prototypes can in part facilitate a homogeneous and continuous supply of lubricant, a highly precise metering of very small amounts of lubricant, an immediate availability of the lubricant to the friction surface, a highly accurate tuning of the required amount of lubricant, an immediate reaction to changed process parameters, an individual tuning of the lubricant amounts for each outlet, a lower installation cost without compressed air, lower operating costs due to the lack of compressed air consumption, a supply with 12/24 volts, an optimal lubricant usage through direct supply and an improved environmental friendliness due to a lower lubricant and air consumption. Here, however, exemplary embodiments need not realize all possibilities at all, nor even multiple advantages.

Although some aspects have been described in connection with a device, it is understood that these aspects also represent a description of the corresponding process, so that a block or a component of a device is also understood as a corresponding process step or as a characteristic of a process step. Similarly, aspects which have been described in connection with a process step or as a process step also represent a description of a corresponding block or detail or characteristic of a corresponding device.

Depending on certain implementation requirements, exemplary embodiments of the invention can be implemented in hardware or in software. The implementation can be accomplished through the use of a digital storage medium, for example a floppy disk, a DVD, a Blu-ray disc, a CD, a ROM, a PROM, an EPROM, an EEPROM or a flash storage, a hard disk or another magnetic or optical storage, on which electronically readable control signals are stored, which can interact or interact with a programmable hardware component such that the relevant method is carried out.

A programmable hardware component can be formed by a processor, a computer processor (CPU=Central Processing Unit), a graphics processor (GPU=Graphics Processing Unit), a computer, a computer system, an application-specific integrated circuit (ASIC=Application-specific Integrated Circuit), an integrated circuit (IC=Integrated Circuit), a system on chip (SOC=System on Chip), a programmable logic element or a field programmable gate array with a microprocessor (FPGA=Field Programmable Gate Array).

The digital storage medium can thus be machine or computer readable. Some exemplary embodiments therefore comprise a data storage device, which has electronically readable control signals which are capable of interacting with a programmable computer system or a programmable hardware component such that one of the methods described herein is carried out. An exemplary embodiment is therefore a data storage device (or a digital storage device or a computer-readable medium), on which the program to carry out one of the methods described herein is recorded.

In general, exemplary embodiments of the present invention can be implemented as a program, firmware, computer program or computer program product with a program code or as data, wherein the program code or the data is or are effective to carry out one of the methods, if the program runs on a processor or a programmable hardware component. The program code or the data can or can for example also be stored on a machine-readable carrier or data storage device. The program code or the data can exist as, among others, source code, machine code as well as other intermediate code.

A further exemplary embodiment is further a data stream, a signal sequence or a sequence of signals, which represents or represent the program to carry out one of the methods described herein. The data stream, the signal sequence or the sequence of signals can for example be configured to the effect that they are to be transferred over a data communication connection, for example over the Internet or another network. Exemplary embodiments are thus also signal sequences representing data, which signal sequences are suitable for a transmission over a network or a data communication connection, wherein the data represent the program.

A program according to an exemplary embodiment can for example translate one of the methods during its execution such that it reads from memory locations or writes a datum or multiple data into this memory location, wherein if necessary switching processes or other processes are caused in transistor structures, in amplifier structures or in other electrical, optical, or magnetic components, or components that work according to another functional principle. Correspondingly, data, values, sensor values or other information of a program can be collected, determined or measured by reading from a memory location. A program can therefore collect, determine or measure variables, values, measurement variables, and other information, as well as cause, initiate, or perform an action, or control other devices, machines and components by writing into one or more memory locations.

The above-described exemplary embodiments merely represent illustrations of the principles of the present invention. It is understood that modifications and variations of the arrangements and details described herein will be evident to other experts. Therefore it is intended that the invention simply be limited through the scope of the following patent claims and not through the specific details on the basis of which the description and the explanation of the exemplary embodiments were presented herein.

REFERENCE NUMBER LIST

100 Metering device
110 Lubricant reservoir
120 Outlet
130 Metering apparatus
140 Microvalve
150 Control circuit
160 Control signal line
170 Actuator
180 First connector
190 Second connector
200 Connector
210 Housing
220 Valve seat 230 Stationary armature
240 Mobile armature
250 First section
260 Coil
270 Second section
280 Spring
290 Ruby ball
300 Ball holder
310 Time progression
320 Containers
330 Filling level sensor
340 Pressure sensor
350 Sensor switch
360 Sensor switch
370 Sensor signal line
380 Flow sensor
390 Bypass conduit
400 Bypass valve
410 Second connector
420 First connector
430 Sensor switch
440 Sensor signal line
450 Actuator
460 Control signal line
470 Conduit section
480 Arrow
490 Sensor support
500 Temperature sensor
510 Heating element
520 Hollow cylinder
530 Seal
540 Closing component
550 Valve unit
560 Stopcock
570 Manifold connector
580 Media connector
590 Bore
600 Coarse filter
610 Connector
620 Closer screw
630 Leak
640 First partial volume
650 Second partial volume
660 Level
670 Lateral outlet
680 Vertical outlet
690 Connector
700 Connector
710 Bore
715 Float switch
720 Connector
730 Conduit
740 Volume
750 Bore
760 Further bore
770 Conduit
780 Intermediate volume
790 Further bore
800 Conduit
810 Intermediate supply conduit
820 First hollow space
830 Bore
840 Second hollow space
850 Intermediate conduit
860 Conduit
870 Supply conduit bore
880 Channel
890 Bore
900 Opening
910 Bore
920 Installation space
930 Bore
940 Bore
950 Machine
960 Machine tool
970 Spindle
980 Bearing unit
990 Housing
1000 Machine part
1010 Rolling-element bearing
1020 Outer ring
1030 Inner ring
1040 Filling coupling
1050 Electrical interface
1060 First connector
1070 Second connector
Ip Peak current
Ih Holding current
T Cycle time
To Valve opening time
Tp Peak time
Th Holding time

The invention claimed is:

1. A metering device for dispensing a predetermined amount of lubricant comprising:
a lubricant reservoir configured to retain a lubricant and to dispense the lubricant under pressure via a connector of the lubricant reservoir;
a metering apparatus comprising at least one microvalve;
a flow sensor;
a bypass conduit arranged in parallel to the flow sensor; and
a bypass valve coupled to the bypass conduit,
wherein the at least one microvalve is fluidly coupled with the connector of the lubricant reservoir and is configured to dispense the predetermined amount of lubricant in a defined manner,
wherein the metering apparatus is spatially separable from the lubricant reservoir,
wherein the flow sensor is disposed and configured such that a flow rate of the lubricant is determined when the lubricant exits the lubricant reservoir and/or flows through the microvalve,
wherein flow of the lubricant through the flow sensor is partially or completely switchable to the bypass conduit by the bypass valve, and
wherein the at least one microvalve is fluidly coupled with an outlet of the flow sensor and the bypass conduit.

2. The metering device according to claim 1, wherein the metering apparatus and the lubricant reservoir are spatially separable from each other by at least 50 cm.

3. The metering device according to claim 2, wherein the at least one microvalve comprises a valve ball made of ruby and a valve seat made of sapphire.

4. The metering device according to claim 3, wherein at least one microvalve comprises a coil and at least one movable armature electromagnetically driven by the coil.

5. The metering device according to claim 1, wherein the lubricant reservoir comprises a first housing and the metering apparatus comprises a second housing different from the first housing.

6. The metering device according to claim 1, wherein the lubricant reservoir and the metering apparatus each include a connector for the pipe conduit such that the outlet of the lubricant reservoir is connectable with the metering apparatus via the pipe conduit, wherein the connectors for the pipe conduit are configured to accommodate a hollow cylinder-shaped pipe conduit having an outer diameter and an inner diameter.

7. A lubricant system comprising:
   a metering device according to claim 1; and
   a machine having a machine part to be lubricated,
   wherein the machine part is fluidly coupled with the at least one microvalve of the metering apparatus so that the microvalve can dispense to the machine part the predetermined amount of lubricant in defined manner, and
   wherein the lubricant reservoir is disposed spatially separated from the metering apparatus.

8. The lubricant system according to claim 7, wherein the lubricant reservoir is disposed in a dangerous material space, a dangerous material cabinet, a lubricant space or a lubricant cabinet.

9. The lubricant system according to claim 7, wherein the microvalve is coupled with the machine part via a through-extending conduit system that, when the predetermined amount of lubricant is dispensed, experiences no or a negligible change of a volume of the conduit system and/or wherein the outlet of the lubricant reservoir is fluidly coupled with the microvalve via a conduit system that, when the predetermined amount of lubricant is dispensed, experiences no or a negligible change of a volume of the conduit system.

10. The metering device according to claim 1, wherein the at least one microvalve configured to dispense the lubricant at a dispensing frequency of several kilohertz and in an amount less than 10 µl and the at least one microvalve has an opening stroke length of less than 10 nm.

11. The metering device according to claim 1 further comprising:
    a control circuit configured to receive a sensor signal from the flow sensor and to output a control signal to the at least one microvalve based on the sensor signal received from the flow sensor.

12. The metering device according to claim 1, wherein the bypass valve includes a first outlet fluidly coupled to the flow sensor and a second outlet fluidly coupled to the bypass conduit.

13. A method for dispensing a predetermined amount of lubricant, comprising:
    dispensing a lubricant out of a lubricant reservoir under pressure to at least one microvalve of a spatially-separated metering apparatus, wherein the lubricant flows from the lubricant reservoir to the at least one microvalve through a flow sensor or a bypass conduit, and wherein the at least one microvalve is fluidly coupled with an outlet of the flow sensor and the bypass conduit;
    dispensing the predetermined amount of lubricant in a defined manner via the microvalve to a machine part of a machine; and
    determining a flow rate of the lubricant dispensed out of the lubricant reservoir and/or through the microvalve using the flow sensor.

14. The method according to claim 13, wherein the predetermined amount of lubricant is less than 10 µl.

15. The method according to claim 14, wherein the predetermined amount of lubricant is less than 50 nl and the at least one microvalve has an opening stroke length of less than 10 nm.

16. The method according to claim 15, wherein the at least one microvalve dispenses the lubricant at a dispensing frequency of several kilohertz.

17. The method according to claim 16, wherein the at least one microvalve comprises a valve ball made of ruby and a valve seat made of sapphire.

18. The method according to claim 17, wherein at least one microvalve comprises a coil and at least one movable armature electromagnetically driven by the coil.

19. The method according to claim 13 further comprising:
    switching flow of lubricant through the flow sensor to the bypass conduit by activating a bypass valve fluidly coupled to the bypass conduit.

20. The method of according to claim 13 further comprising:
    monitoring the amount of lubricant dispensed through the at least one microvalve with the flow sensor; and
    comparing the amount of lubricant dispensed through the at least one microvalve with the predetermined amount of lubricant.

* * * * *